(12) United States Patent
Lee

(10) Patent No.: US 12,379,813 B2
(45) Date of Patent: Aug. 5, 2025

(54) DISPLAY APPARATUS

(71) Applicant: Samsung Display Co., Ltd., Yongin-Si (KR)

(72) Inventor: Choonhyop Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/642,825

(22) Filed: Apr. 23, 2024

(65) Prior Publication Data

US 2025/0077032 A1    Mar. 6, 2025

(30) Foreign Application Priority Data

Aug. 30, 2023  (KR) .................. 10-2023-0114264

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 2203/04111* (2013.01)

(58) Field of Classification Search
CPC .......... G06F 3/0446; G06F 3/0416; G06F 2203/04111
See application file for complete search history.

(56) References Cited

U.S. PATENT DOCUMENTS

| | | | | |
|---|---|---|---|---|
| 8,810,543 B1 * | 8/2014 | Kurikawa | ........... | G06F 3/04166 345/173 |
| 9,092,097 B2 * | 7/2015 | Kang | .................. | G06F 3/0446 |
| 9,454,274 B1 * | 9/2016 | Kurikawa | ........... | G06F 3/04166 |
| 9,619,088 B2 * | 4/2017 | Azumi | ................ | G06F 3/04166 |
| 10,613,679 B2 | 4/2020 | Chung | | |
| 11,294,503 B2 | 4/2022 | Westerman | | |
| 11,455,066 B2 * | 9/2022 | Cho | ....................... | G06F 3/0446 |
| 2009/0250269 A1 * | 10/2009 | Hung | ...................... | G06F 3/044 178/18.06 |
| 2009/0251428 A1 * | 10/2009 | Hung | .................. | G06F 3/04164 345/173 |
| 2009/0251437 A1 * | 10/2009 | Hung | .................. | G06F 3/04166 345/174 |

(Continued)

FOREIGN PATENT DOCUMENTS

| | | |
|---|---|---|
| KR | 10-2011-0066450 A | 6/2011 |
| KR | 10-2019-0079170 A | 7/2019 |
| KR | 10-2019-0136257 A | 12/2019 |

*Primary Examiner* — Amy Onyekaba
(74) *Attorney, Agent, or Firm* — Innovation Counsel LLP

(57) ABSTRACT

A display apparatus is disclosed that includes a first touch sensor including first driving electrodes and first sensing electrodes arranged in a first area, a second touch sensor including second driving electrodes and second sensing electrodes arranged in a second area, a first touch integrated circuit configured to generate a first sensing signal, a second touch integrated circuit configured to generate a second sensing signal, and a control unit configured to select a touch area including a touch location from among the first area and the second area, based on the first sensing signal and the second sensing signal, and control the first touch integrated circuit and the second touch integrated circuit to sense the touch area in a first sensing mode and the remaining area in a second sensing mode.

20 Claims, 28 Drawing Sheets

(56) References Cited

U.S. PATENT DOCUMENTS

| | | | |
|---|---|---|---|
| 2010/0156811 A1* | 6/2010 | Long | G06F 3/0446 |
| | | | 345/173 |
| 2011/0141040 A1* | 6/2011 | Kang | G06F 3/0446 |
| | | | 345/173 |
| 2011/0242015 A1* | 10/2011 | Lou | G06F 3/0416 |
| | | | 345/173 |
| 2012/0169660 A1* | 7/2012 | Seo | G06F 3/0446 |
| | | | 345/174 |
| 2012/0229416 A1* | 9/2012 | Ku | G06F 3/0443 |
| | | | 345/174 |
| 2013/0215049 A1* | 8/2013 | Lee | G06F 3/041 |
| | | | 345/173 |
| 2015/0062031 A1* | 3/2015 | Kono | G06F 3/041 |
| | | | 345/173 |
| 2015/0242022 A1* | 8/2015 | Hung | G06F 3/0446 |
| | | | 345/174 |
| 2016/0195990 A1* | 7/2016 | Han | G06F 1/3262 |
| | | | 345/173 |
| 2016/0328042 A1* | 11/2016 | Chang | G06F 3/0446 |
| 2019/0163313 A1* | 5/2019 | Kim | G06F 3/0412 |
| 2019/0227657 A1* | 7/2019 | Shimizu | G06F 3/04166 |
| 2019/0369799 A1* | 12/2019 | Jeon | G06F 3/0448 |
| 2020/0050360 A1* | 2/2020 | Jeon | G06V 40/1306 |
| 2021/0034835 A1* | 2/2021 | Cheng | G06F 3/0412 |
| 2022/0108557 A1* | 4/2022 | Cheng | G06F 3/0412 |
| 2023/0094957 A1* | 3/2023 | Lee | G06F 3/0412 |
| | | | 345/174 |

* cited by examiner

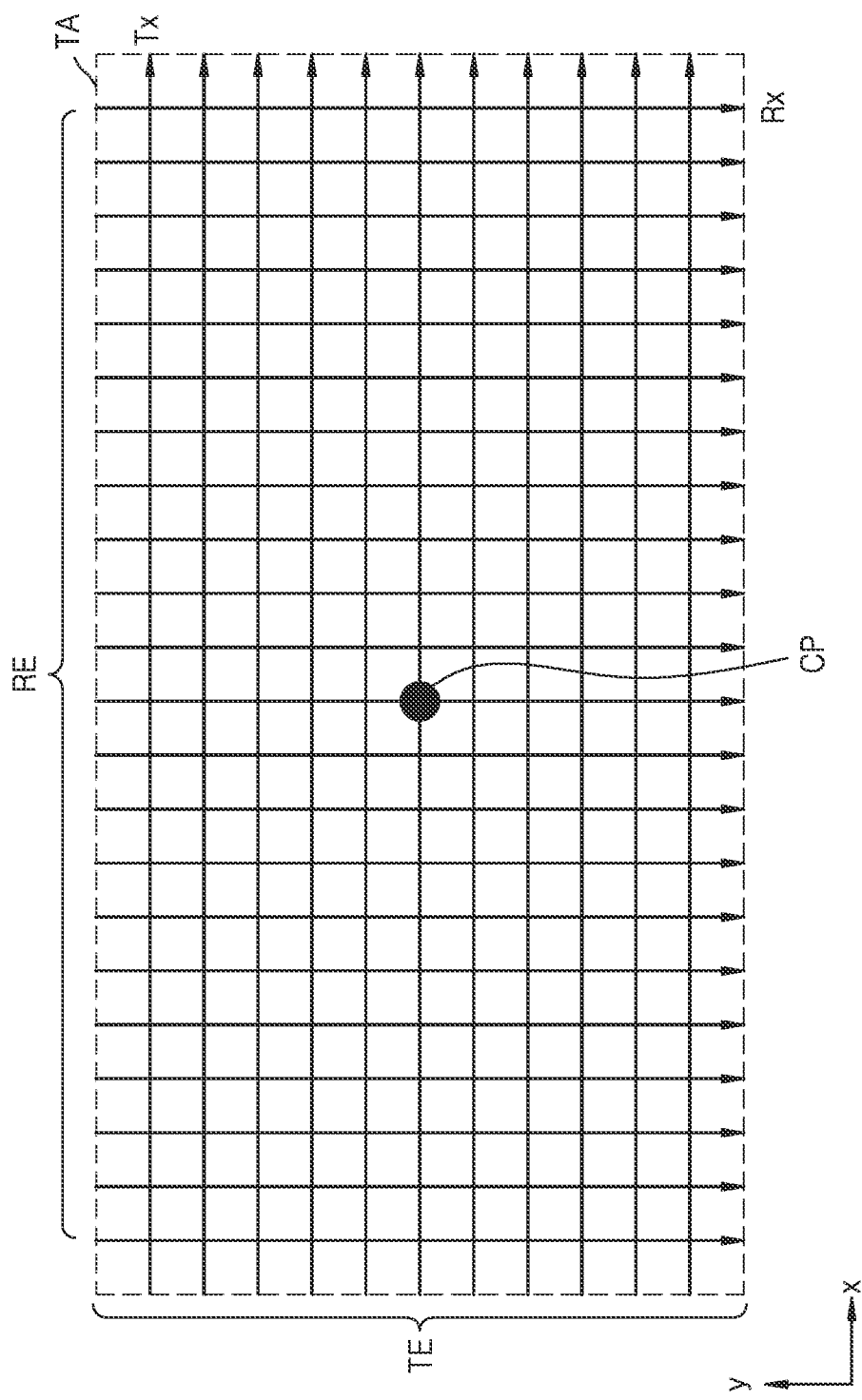

DISPLAY APPARATUS

CROSS-REFERENCE TO RELATED APPLICATION

This application is based on and claims priority under 35 U.S.C. § 119 to Korean Patent Application No. 10-2023-0114264, filed on Aug. 30, 2023, in the Korean Intellectual Property Office, the disclosure of which is incorporated by reference herein in its entirety.

BACKGROUND

1. Field

Embodiments relate to a display apparatus.

2. Description of the Related Art

Display apparatuses have become widely used. Also, as the thickness and weight of display apparatuses has decreased, applications of display apparatuses has increased.

A display apparatus may each include a touch sensing device as an input device. The touch sensing device may include a touch sensor and a touch integrated circuit for driving the touch sensor and sensing touches.

Examples of well-known touch sensing techniques for the touch sensing device include an electromagnetic induction technique, a pressure sensing technique, and a capacitive technique. In the capacitive technique, a touch input, such as a finger or a stylus, is in contact with a touch sensor. The touch sensing device may determine the locations of touch inputs by a touch integrated circuit detecting a capacitance change in electrodes forming the touch sensor.

As display apparatuses become larger, touch sensors covering the front surfaces of the display apparatuses have increased in size. As the size of a touch sensor has increases and their thickness has decreased, an RC load on the touch sensor grows.

SUMMARY

Embodiments may provide a display apparatus with reduced sensing time and power consumption. However, this is an example, and the scope of the disclosure is not limited thereto.

Additional aspects will be set forth in part in the description which follows and, in part, will be apparent from the description, or may be learned by practice of the presented embodiments of the disclosure.

An embodiment of a display apparatus includes a first touch sensor including a plurality of first driving electrodes arranged in a first area and a plurality of first sensing electrodes crossing the plurality of first driving electrodes, a second touch sensor including a plurality of second driving electrodes arranged in a second area and a plurality of second sensing electrodes crossing the plurality of second driving electrodes, a first touch integrated circuit connected to the plurality of first driving electrodes and the plurality of first sensing electrodes and configured to generate a first sensing signal, a second touch integrated circuit connected to the plurality of second driving electrodes and the plurality of second sensing electrodes and configured to generate a second sensing signal, and a control unit configured to select a touch area including a touch location from among the first area and the second area, based on the first sensing signal and the second sensing signal, and control the first touch integrated circuit and the second touch integrated circuit to sense the touch area in a first sensing mode and a remaining area in a second sensing mode.

The first touch integrated circuit and the second touch integrated circuit may be configured to sense, in the first sensing mode, a variation in mutual capacitance in a corresponding area and a variation in self-capacitance in the corresponding area, and sense, in the second sensing mode, the variation in the self-capacitance in the corresponding area.

In an initial state in which there is no contact with a contact target, the control unit may be configured to control the first touch integrated circuit and the second touch integrated circuit to sense the first area and the second area in the first sensing mode.

When it is determined that there is no touch in the touch area, the control unit may be configured to control the first touch integrated circuit and the second touch integrated circuit to sense the first area and the second area in the first sensing mode.

When it is determined that there is a touch in the touch area, the control unit may be configured to control the first touch integrated circuit and the second touch integrated circuit to sense the touch area in the first sensing mode and the remaining area in the second sensing mode.

When the contact target maintains a touch for a preset period of time or more, the control unit may be configured to control the first touch integrated circuit and the second touch integrated circuit to sense the touch area in a third sensing mode and the remaining area in the second sensing mode.

The first touch integrated circuit and the second touch integrated circuit may be configured to sense a variation in mutual capacitance in a first sub-area and a variation in self-capacitance in the touch area in the third sensing mode, the first sub-area being determined to have the touch location at a center of the first sub-area.

The first sub-area may include a number of driving electrodes, the number being determined to have the touch location at the center of the first sub-area.

As the touch location is moved, the first sub-area may be moved to make the touch location be at a center.

The driving electrodes arranged in the first sub-area may be grouped into a plurality of groups each including at least two driving electrodes, and the at least two driving electrodes in one group may be simultaneously sensed.

The control unit may be configured to control the first touch integrated circuit and the second touch integrated circuit to sense the touch area alternately in the third sensing mode and a fourth sensing mode and the remaining area in the second sensing mode.

The first touch integrated circuit and the second touch integrated circuit may be configured to sense a variation in mutual capacitance in a first sub-area and a variation in self-capacitance in the touch area in the third sensing mode, the first sub-area being determined to have the touch location at the center and sense a variation in mutual capacitance in a second sub-area and a variation in self-capacitance in a third sub-area in the fourth sensing mode, each of the second sub-area and the third sub-area being determined to have the touch location at a center of each sub-area.

Each of the first sub-area and the second sub-area may include an area in which a number of driving electrodes is arranged, the number being determined to have the touch location at the center of each sub-area, and the third sub-area may include an area where a number of driving electrodes and a number of sensing electrodes are arranged, the numbers being determined to have the touch location at the center of the third sub-area.

The first sub-area may include an area where a number of driving electrodes is arranged, the number being determined to have the touch location at the center of the first sub-area, the second sub-area may include an area where a number of driving electrodes and a number of sensing electrodes are arranged, the numbers being determined to have the touch location at the center of the second sub-area, and the third sub-area may include an area where a number of driving electrodes and a number of sensing electrodes are arranged, the numbers being determined to have the touch location at the center of the third sub-area.

As the touch location is moved, the second sub-area may be moved to make the touch location be at a center.

The first touch integrated circuit may be arranged adjacent to the first area, and the second touch integrated circuit may be arranged adjacent to the second area.

The control unit may be mounted on the first touch integrated circuit, and the second touch integrated circuit may be electrically connected to the first touch integrated circuit.

The display apparatus may further include a third touch integrated circuit electrically connected to the first touch integrated circuit and the second touch integrated circuit, wherein the control unit may be mounted on the third touch integrated circuit.

Each of the first touch integrated circuit and the second touch integrated circuit may include a signal driver configured to apply a plurality of driving signals to a plurality of driving electrodes respectively connected to a corresponding integrated circuit, a signal sensor configured to receive a plurality of sensing signals from a plurality of sensing electrodes respectively connected to the corresponding integrated circuit, and a memory.

The signal driver may perform multi-channel driving during which the plurality of driving signals are simultaneously applied to two or more driving electrodes through a plurality of channels.

Other aspects, features, and advantages other than those described above will become apparent from the following detailed description, claims and drawings for carrying out the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 13A, 13B, and 13C are diagrams for explaining a drawing mode, according to an embodiment;

DETAILED DESCRIPTION

Figure 1:
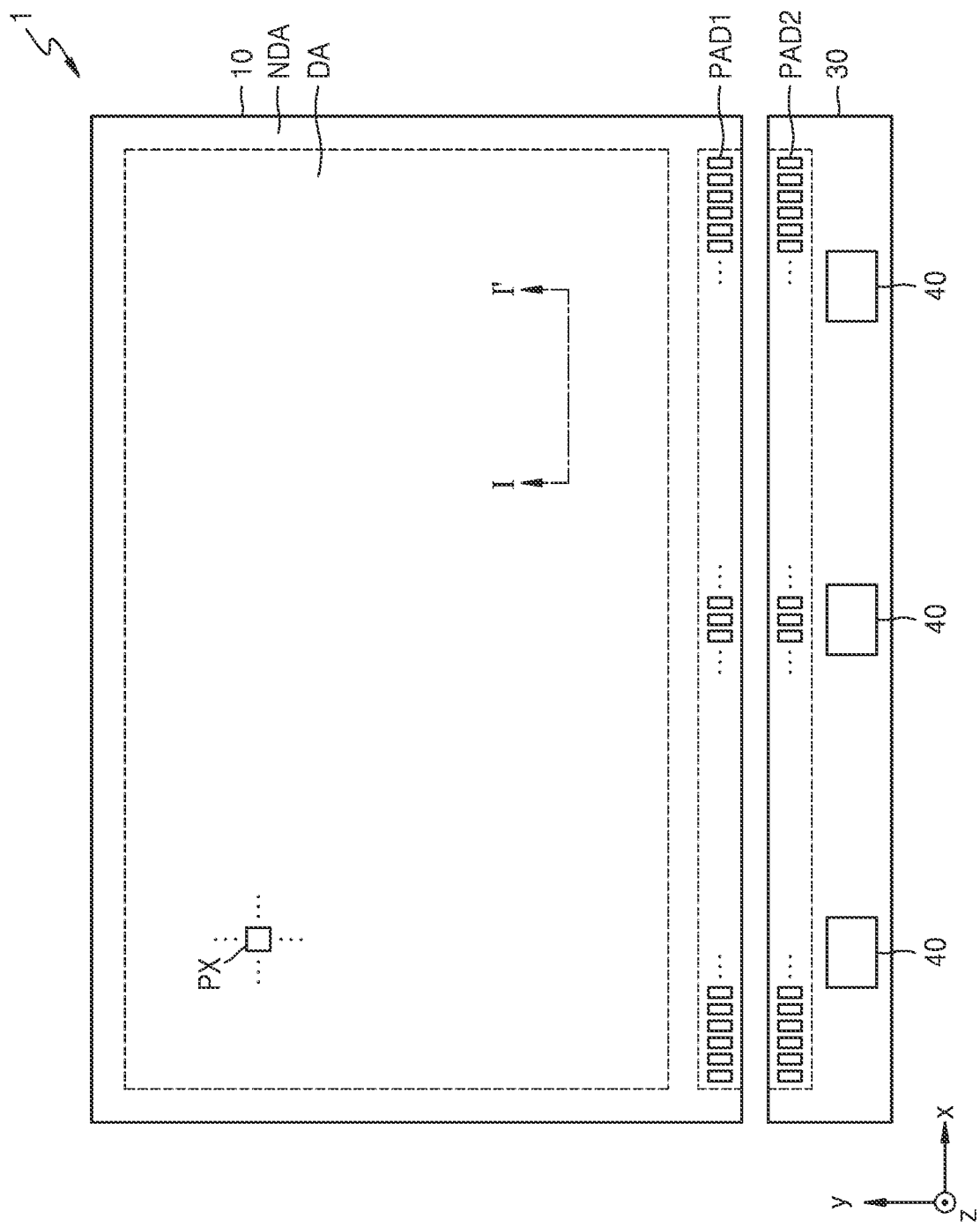
FIG. 1 is a schematic plan view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B." Throughout the disclosure, the expression "at least one of a, b, or c" indicates only a, only b, only c, both a and b, both a and c, both b and c, all of a, b, and c, or variations thereof.

As the disclosure allows for various changes and numerous embodiments, particular embodiments will be shown in the drawings and described in detail in the written description. The attached drawings for illustrating embodiments are referred to in order to gain a sufficient understanding of the disclosure, the merits thereof, and the objectives accomplished by the implementation of the disclosure. The disclosure may, however, be embodied in many different forms and should not be construed as being limited to the embodiments set forth herein.

Hereinafter, one or more embodiments of the disclosure will be described in detail with reference to the accompanying drawings. Like elements in the drawings denote like elements, and repeated descriptions thereof are omitted.

It will be understood that although the terms "first," "second," etc. may be used herein to describe various elements, these elements should not be limited by these terms, and these elements are only used to distinguish one element from another.

As used herein, the singular forms "a," "an," and "the" are intended to include the plural forms as well, unless the context clearly indicates otherwise.

It will be further understood that the terms "comprises" and "includes" (and their variations such as "comprising") used herein specify the presence of stated features or elements, but do not preclude the presence or addition of one or more other features or elements.

It will be understood that when a layer, region, or element is referred to as being "formed on" another layer, region, or element, it can be directly or indirectly formed on the other layer, region, or element. That is, for example, intervening layers, regions, or elements may be present.

It will be understood that when a layer, region, or component is referred to as being connected to another layer, region, or component, it can be directly or indirectly connected to the other layer, region, or component. For example, when a layer, region, or component is referred to as being electrically connected to another layer, region, or component, it can be directly or indirectly electrically connected to the other layer, region, or component.

In the following examples, the x-axis, the y-axis and the z-axis are not limited to three axes of the rectangular coordinate system and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Sizes of elements in the drawings may be exaggerated for convenience of explanation. In other words, since sizes and thicknesses of elements in the drawings are arbitrarily illustrated for convenience of explanation, the following embodiments are not limited thereto.

FIG. 1 is a schematic plan view of a display apparatus according to an embodiment.

Referring to FIG. 1, the display apparatus 1 may include a display panel 10 and a plurality of integrated circuits 40 for driving the display panel 10.

The display panel 10 may include a display area DA where images are displayed, and a non-display area NDA outside the display area DA. The display area DA may be entirely surrounded by the non-display area NDA.

In the display area DA of the display panel 10, a plurality of pixels PX including various display elements, such as organic light-emitting diodes, may be arranged. The pixel PX may be provided in the plural, and the pixels PX may be arranged in various forms, such as a stripe form, a Pentile™ form, and a mosaic form, to produce images.

When viewed in a plan view, the display area DA may have a rectangular shape as shown in FIG. 1. Alternatively, the display area DA may have a polygonal shape, such as a triangle, a pentagon, or a hexagon, a circular shape, an oval shape, or an atypical shape.

In the non-display area NDA of the display panel 10, no images are displayed, and no pixels PX are arranged. In the non-display area NDA, various lines configured to deliver electrical signals to be applied to elements in the display area DA, driving circuits, and first pads PAD1 connected to the lines may be arranged.

Each integrated circuit 40 may be mounted on a circuit board 30. Each integrated circuit 40 may be mounted on the circuit board 30 in a chip on plastic (COP) manner or a chip on glass (COG) manner.

In the circuit board 30, lines connecting the integrated circuits 40 to second pads PAD2 may be arranged, and the integrated circuits 40 may be connected to the display panel 10 through the lines and the second pads PAD2.

Some of the integrated circuits 40 may be configured to generate electrical signals transmitted to the pixels PX or the driving circuits. Others of the integrated circuits 40 may be configured to generate electrical signals transmitted to a touch sensing portion including driving electrodes and sensing electrodes.

The display apparatus 1 may be an organic light-emitting display apparatus including display elements with brightness varying according to currents, for example, organic light-emitting diodes. Alternatively, the display apparatus 1 may be an inorganic light-emitting display apparatus (or an inorganic EL display apparatus) or a quantum dot light-emitting display apparatus. That is, an emission layer of the display element included in the display apparatus 1 may include an organic material, an inorganic material, quantum dots, both an organic material and quantum dots, both an inorganic material and quantum dots, or an organic material, an inorganic material, and quantum dots. Hereinafter, a case where the display apparatus 1 is an organic light-emitting display apparatus is mainly described.

Figure 2:
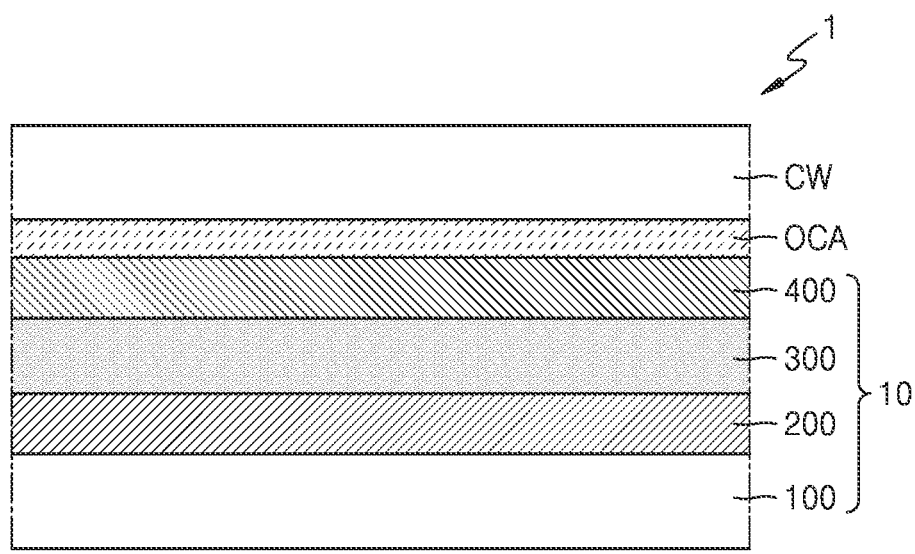
FIG. 2 is a schematic cross-sectional view of a display apparatus according to one or more embodiments.

FIG. 2 is a schematic cross-sectional view of a display apparatus according to one or more embodiments.

Referring to FIG. 2, the display apparatus 1 may include the display panel 10 and a cover window CW covering the display panel 10.

The display panel 10 may include a substrate 100, a display element layer 200, an encapsulation layer 300, and a touch sensor layer 400.

The substrate 100 may include an insulating material, such as glass, quartz, or polymer resin. The substrate 100 may be a rigid substrate or a flexible substrate that is bendable, foldable, or rollable. For example, the substrate 100 may include polymer resin such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multilayered structure that includes a layer including the above polymer resin and an inorganic layer (not shown). For example, the substrate 100 may include two layers including the above polymer resin and an inorganic barrier layer arranged therebetween.

The display element layer 200 may be disposed above the substrate 100. The display element layer 200 may include a plurality of pixels and may be a layer that displays an image. The display element layer 200 may include a plurality of display elements and a plurality of pixel circuits electrically connected to the display elements. Also, the display element layer 200 may include scan lines connected to the pixel circuits, data lines, power lines, a scan driver configured to apply scan signals to the scan lines, fan-out lines connecting the data lines to a display driver, and the like.

Above the display element layer 200, the encapsulation layer 300 for sealing the display element may be disposed. The encapsulation layer 300 may include at least one organic encapsulation layer and provide a planar base surface. Therefore, even though the touch sensor layer 400 is formed through a continuous process, an error rate may decrease.

The touch sensor layer 400 may be disposed above the encapsulation layer 300. The touch sensor layer 400 may include a touch sensor and signal lines connected to the touch sensor and be a layer for detecting the occurrence of touch inputs from a user and a touch location. The touch sensor layer 400 may sense the occurrence of touch inputs from the user and a touch location in a capacitive manner by measuring a capacitance variation in driving electrodes and sensing electrodes which constitute the touch sensor.

As shown in FIG. 2, the touch sensor layer 400 may be formed through a continuous process together with the encapsulation layer 300. For example, the touch sensor layer 400 may be directly formed on the base surface of the encapsulation layer 300.

As another example, the touch sensor layer 400 may include a functional module separated from the display panel 10 and be arranged between the display panel 10 and the cover window CW. In this case, the touch sensor layer 400 may be coupled to the display panel 10 by an optical clear adhesive OCA or optical clear resin.

The cover window CW may be disposed above the display panel 10. The cover window CW may protect the upper surface of the display panel 10. The cover window CW may be coupled to the display panel 10 by the optical clear adhesive OCA or optical clear resin.

Figure 3:
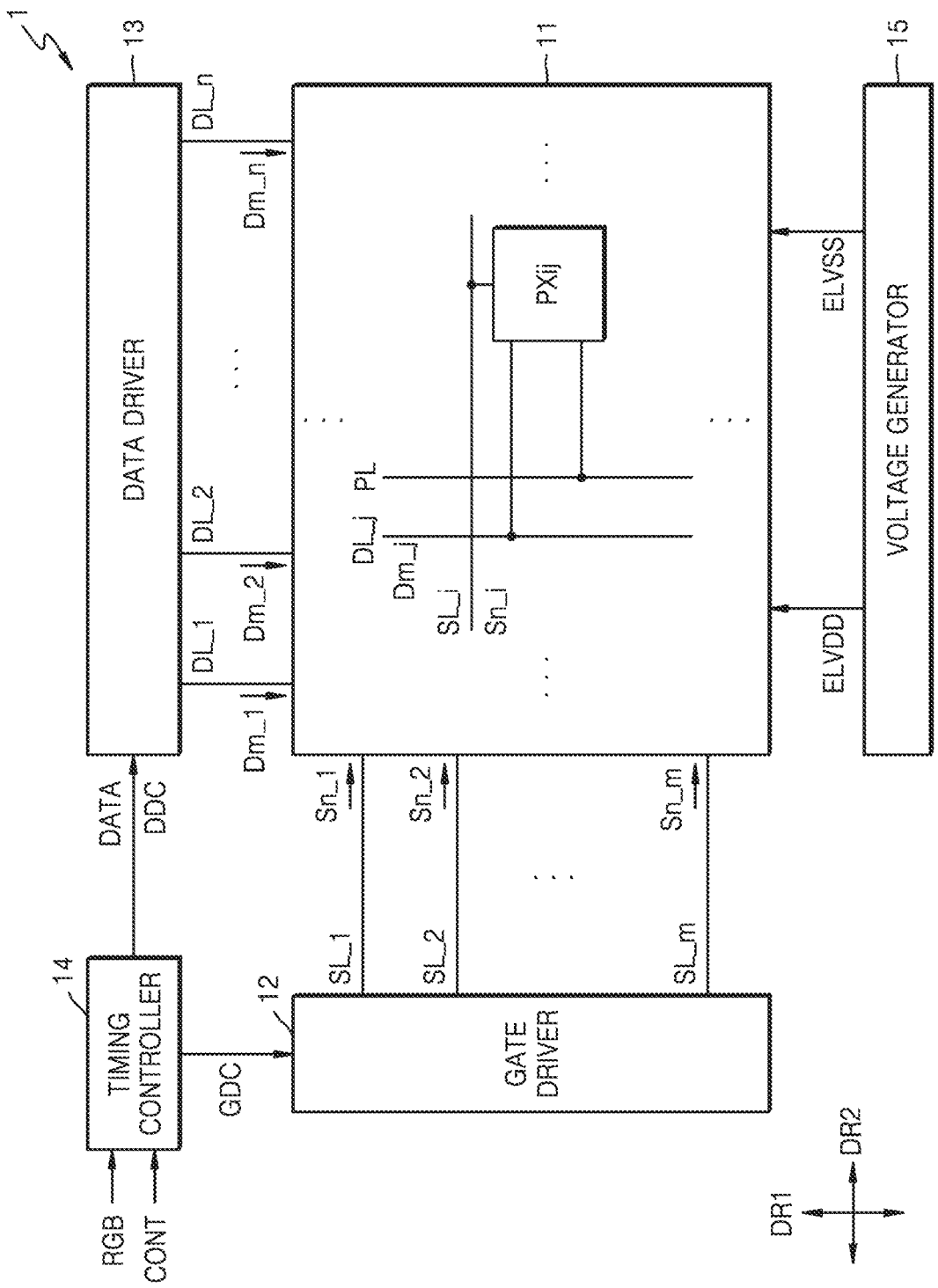
FIG. 3 is a schematic block diagram of a display apparatus according to an embodiment.
Figure 4:
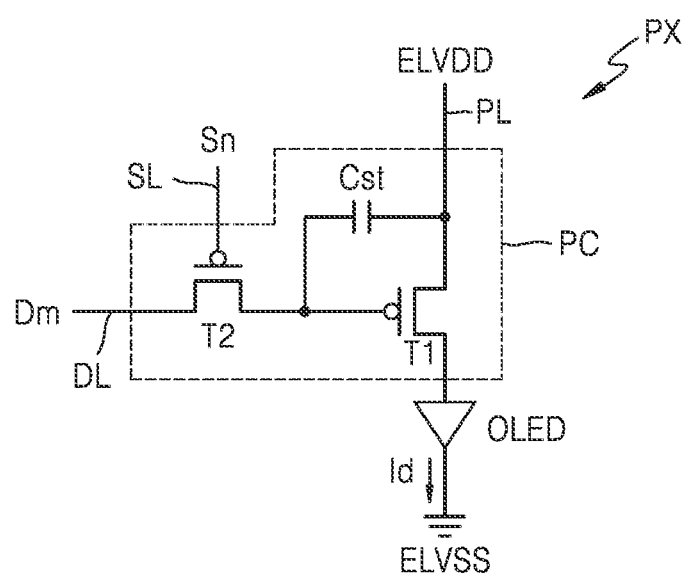
FIG. 4 is an equivalent circuit diagram of a pixel included in a display apparatus, according to an embodiment.

FIG. 3 is a schematic block diagram of a display apparatus according to an embodiment. FIG. 4 is an equivalent circuit diagram of a pixel included in a display apparatus, according to an embodiment.

Referring to FIG. 3, the display apparatus 1 includes a display unit 11, a gate driver 12, a data driver 13, a timing controller 14, and a voltage generator 15.

The display unit 11 includes the pixels PX, such as a pixel PXij located in an $i^{th}$ row and a $j^{th}$ column. For easy understanding, FIG. 3 shows one pixel PXij, but m×n pixels PX may be arranged, for example, in a matrix form. Here, i is a natural number ranging from 1 to m, and j is a natural number ranging from 1 to n.

Referring to FIG. 4, a pixel PX including two transistors and one capacitor is described for illustrative purposes. However, one or more embodiments are not applied only to pixels PX including a specific pixel circuit, but may be identically applied to a pixel PX including another pixel circuit, for example, a pixel PX including a pixel circuit that includes three transistors and one capacitor, a pixel PX including a pixel circuit that includes seven transistors and one capacitor, and the like.

Referring to FIG. 3, the pixels PX are connected to scan lines SL_1 to SL_m, data lines DL_1 to DL_n, and a power line PL. For example, the pixel PXij located in the $i^{th}$ row and $j^{th}$ column may be connected to the scan line SL_i, the data line DL_j, and the power line PL.

The data lines DL_1 to DL_n may extend in a first direction DR1 (or a column direction) and be connected to the pixels PX located in the same column. The scan lines SL_1 to SL_m may extend in a second direction DR2 (or a row direction) and be connected to the pixels PX located in the same row.

The power line PL may include a plurality of vertical power lines extending in the first direction DR1, and the vertical power lines may be connected to the pixels PX located in the same column. The power line PL may include a plurality of horizontal power lines extending in the second direction DR2, and the horizontal power lines may be connected to the pixels PX located in the same row. The horizontal power lines may be connected to the vertical power lines, respectively.

The scan lines SL_1 to SL_m is configured to respectively transmit scan signals Sn_1 to Sn_m, which are output from the gate driver 12, to the pixels PX arranged in the same row. The data lines DL_1 to DL_n is configured to respectively transmit data signals Dm_1 to Dm_n, which are output from the data driver 13, to the pixels PX arranged in the same column. The pixel PXij located in the $i^{th}$ row and the $j^{th}$ column receives the scan signal Sn_i and the data signal Dm_j.

The power line PL is configured to transmit, to the pixels PX, a first driving voltage ELVDD output from the voltage generator 15.

The pixel PXij includes a display element and a driving transistor configured to control the intensity of currents flowing to the display element, based on the data signal Dm_j. The data signal Dm_j is output from the data driver 13 and received by the pixel PXij through the data line DL_j. The display element may be, for example, an organic light-emitting diode. As the display element emits light at brightness corresponding to the intensity of currents received from the driving transistor, the pixel PXij may express a gray scale corresponding to the data signal Dm_j. The pixel PX may correspond to a portion of a unit pixel capable of displaying full colors, for example, a sub-pixel. The pixel PXij may further include at least one switching transistor and at least one capacitor.

The voltage generator 15 may be configured to generate voltages required to drive the pixel PXij. For example, the voltage generator 15 may generate the first driving voltage ELVDD and a second driving voltage ELVSS. A level of the first driving voltage ELVDD may be higher than that of the second driving voltage ELVSS.

The voltage generator 15 may generate an initialization voltage and provide the same to the pixels PX. The initialization voltage may be applied to a gate of the driving transistor or an anode of the display element.

Also, the voltage generator 15 may supply, to the gate driver 12, a turn-on voltage and a turn-off voltage for controlling the switching transistor of the pixel PXij. The switching transistor may be turned on when the turn-on voltage is applied to the gate of the switching transistor and may be turned off when the turn-off voltage is applied to the gate of the switching transistor. The voltage generator 15 may generate gamma reference voltages and provide the same to the data driver 13.

The timing controller 14 may control operation timings of the gate driver 12 and the data driver 13, thus controlling the display unit 11. The pixels PX of the display unit 11 may receive a new data signal Dm in each frame duration and emit light at the brightness corresponding to the data signal Dm, thus displaying an image corresponding to image source data RGB of one frame.

The timing controller 14 receives the image source data RGB and a control signal CONT from the outside. The timing controller 14 may convert the image source data RGB into image data DATA, based on characteristics of the display unit 11 and the pixels PX, etc. The timing controller 14 may provide the image data DATA to the data driver 13.

The control signal CONT may include a vertical synchronization signal, a horizontal synchronization signal, a data enable signal, a clock signal, and the like. The timing controller 14 may control the operation timings of the gate driver 12 and the data driver 13 by using the control signal CONT. The timing controller 14 may determine a frame duration by counting the data enable signal in a horizontal scanning period. In this case, the vertical synchronization signal and the horizontal synchronization signal provided from the outside may be omitted. The image source data RGB includes luminance information of the pixels PX. The luminance may have preset levels, for example, $1024(=2^{10})$, $256(=2^8)$, or $64(=2^6)$ gray scales.

The timing controller 14 may generate control signals that include a gate timing control signal GDC for controlling the operation timing of the gate driver 12 and a data timing control signal DDC for controlling the operation timing of the data driver 13.

The gate timing control signal GDC may include a gate start pulse, a gate shift clock, a gate output enable signal, and the like. The gate start pulse is provided to the gate driver 12 configured to generate a first scan signal at a point in time when a scanning period starts. The gate shift clock may be a clock signal that is commonly input to the gate driver 12 and configured to shift the gate start pulse. The gate output enable signal controls the output of the gate driver 12.

The data timing control signal DDC may include a source start pulse, a source sampling clock, a source output enable signal, and the like. The source start pulse controls a point in time when data sampling of the data driver 13 starts and is provided to the data driver 13 at the point in time when the scanning period starts. The source sampling clock may be a clock signal for controlling a sampling operation of data in the data driver 13, based on a rising edge or a falling edge. The source output enable signal controls the output from the data driver 13. The source start pulse provided to the data driver 13 may be omitted according to a data transmission method.

The gate driver 12 may use the turn-on voltage or the turn-off voltage provided from the voltage generator 15 to sequentially generate the scan signals Sn_1 to Sn_m in response to the gate timing control signal GDC provided from the timing controller 14. The gate driver 12 may include a plurality of transistors and be formed together with the pixels PX through a thin film process. For example, the gate driver 12 may be mounted in the non-display area NDA in the form of an amorphous silicon TFT gate driver circuit (ASG) or an oxide semiconductor TFT gate driver circuit (OSG).

In response to the data timing control signal DDC provided from the timing controller 14, the data driver 13 may sample and latch the image data DATA provided from the timing controller 14 and convert the same into data in a parallel data system. When converting the image data DATA into the data in the parallel data system, the data driver 13 may convert the image data DATA into a gamma reference voltage and convert the gamma reference voltage into an analog data signal. The data driver 13 provides the data signals Dm_1 to Dm_n to the pixels PX through the data lines DL_1 to DL_n. The pixels PX receive the data signals Dm_1 to Dm_n in response to scan signals Sn_1 to Sn_m.

Referring to FIG. 4, the pixel PX may include a pixel circuit PC connected to a scan line SL and a data line DL, and a display element connected to the pixel circuit PC. The display element may be an organic light-emitting diode OLED including a pixel electrode (an anode) and an opposite electrode (a cathode). The opposite electrode of the organic light-emitting diode OLED may be a common electrode to which the second driving voltage ELVSS is applied.

The pixel circuit PC may include a first transistor T1, a second transistor T2, and a storage capacitor Cst.

The first transistor T1 may be a driving transistor in which the intensity of a drain current is determined according to a gate-source voltage, and the second transistor T2 may be a switching transistor that is turned on/off according to the gate-source voltage, substantially, a gate voltage. The first transistor T1 and the second transistor T2 may each be a thin-film transistor.

The first transistor T1 may be referred to as a driving transistor, and the second transistor T2 may be referred to as a scan transistor.

The storage capacitor Cst is connected between the power line PL and a gate of the first transistor T1. The storage capacitor Cst may include a second electrode connected to the power line PL and a first electrode connected to the gate of the first transistor T1. The storage capacitor Cst may store a voltage corresponding to a difference between a voltage from the second transistor T2 and the first driving voltage ELVDD provided to the power line PL.

The first transistor T1 may control the intensity of a driving current Id flowing to the organic light-emitting diode OLED from the power line PL, according to the gate-source voltage. The organic light-emitting diode OLED may emit light having a certain luminance according to the driving current Id. The first transistor T1 may include the gate connected to a first electrode of the storage capacitor Cst, a first terminal connected to the power line PL, and a second terminal connected to the organic light-emitting diode OLED.

The second transistor T2 may be configured to transmit the data signal Dm to the gate of the first transistor T1, in response to the scan signal Sn. The second transistor T2 may include a gate connected to the scan line SL, a drain connected to the data line DL, and a source connected to the gate of the first transistor T1.

FIG. 4 shows that the pixel circuit PC includes two transistors and one storage capacitor, but one or more embodiments are not limited thereto. For example, the pixel circuit PC may include at least three transistors and at least two storage capacitors. In an embodiment, the pixel circuit PC may include three transistors and one storage capacitor. In another embodiment, the pixel circuit PC may include seven transistors and one storage capacitor.

Figure 5:
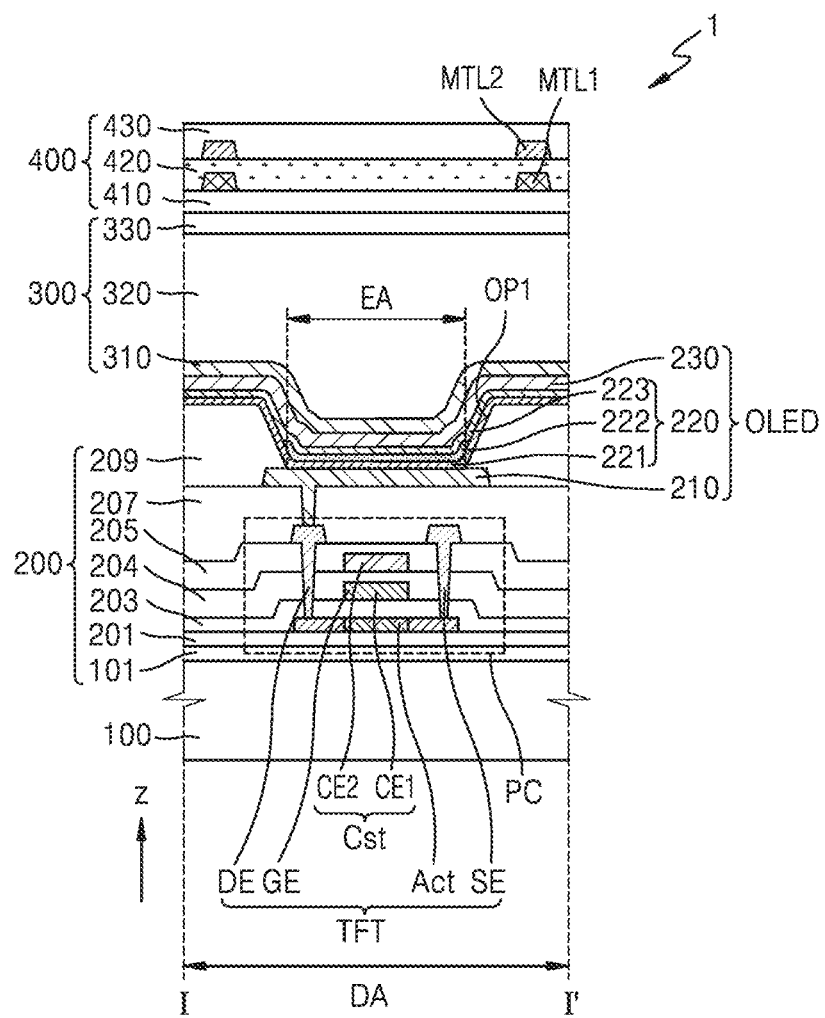
FIG. 5 is a schematic cross-sectional view of the display apparatus of FIG. 1, taken along a line I-I'90 of FIG. 1.

FIG. 5 is a schematic cross-sectional view of the display apparatus of FIG. 1, taken along a line I-I' of FIG. 1.

Referring to FIG. 5, in the display area DA of the substrate 100, the display element layer 200, the encapsulation layer 300, and the touch sensor layer 400 may be sequentially stacked. In the display element layer 200, the organic light-emitting diode OLED and the pixel circuit PC electrically connected to the organic light-emitting diode OLED may be arranged.

As described above with reference to FIG. 2, the substrate 100 may include an insulating material, such as glass, quartz, or polymer resin. The substrate 100 may be a rigid substrate or a flexible substrate that is bendable, foldable, or rollable.

A buffer layer 201 may be disposed above the substrate 100, reduce or prevent the penetration of foreign materials, moisture, or external air from the bottom of the substrate 100, and provide a flat surface to the semiconductor layer Act. The buffer layer 201 may include an inorganic material, such as oxide or nitride, an organic material, or a compound of organic and inorganic materials and may have a single-layer structure or a multilayered structure including organic and inorganic materials.

A barrier layer 101 may be further included between the substrate 100 and the buffer layer 201, the barrier layer 101 preventing the penetration of external air. The barrier layer 101 and the buffer layer 201 may each include silicon oxide ($SiO_2$) or silicon nitride ($SiN_x$).

The pixel circuit PC including the thin-film transistor TFT and the storage capacitor Cst is disposed above the buffer layer 201. The thin-film transistor TFT may correspond to the first transistor T1 described with reference to FIG. 4.

The thin-film transistor TFT may include a semiconductor layer Act, a gate electrode GE, a drain electrode DE, and a source electrode SE.

The semiconductor layer Act may be disposed above the buffer layer 201 and include polysilicon. In another embodiment, the semiconductor layer Act may include amorphous silicon. In another embodiment, the semiconductor layer Act may include oxide of at least one material selected from the group consisting of indium (In), gallium (Ga), stannum (Sn), zirconium (Zr), vanadium (V), hafnium (Hf), cadmium (Cd), germanium (Ge), chromium (Cr), titanium (Ti), and zinc (Zn). The semiconductor layer Act may include a channel area and source and drain areas doped with impurities. The source area and the drain area may be arranged on both sides of the channel area.

A first gate insulating layer 203 may cover the semiconductor layer Act. The first gate insulating layer 203 may include an inorganic insulating material, such as $SiO_x$, $SiN_x$, silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnOx). ZnOx may be ZnO and/or $ZnO2$. The first gate insulating layer 203 may be a layer or layers including the above inorganic insulating material.

The gate electrode GE is disposed above the first gate insulating layer 203 to overlap the semiconductor layer Act. The gate electrode GE may include Mo, Al, Cu, Ti, or the like and be a layer or layers. For example, the gate electrode GE may be a single Mo layer.

A second gate insulating layer 204 may cover the gate electrode GE. The second gate insulating layer 204 may include an inorganic insulating material, such as $SiO_x$, $SiN_x$, SiON, $Al_2O_3$, $TiO_2$, $Ta_2O_5$, $HfO_2$, or ZnOx. The second gate insulating layer 204 may be a layer or layers including the above inorganic insulating material.

A second electrode CE2 of the storage capacitor Cst may be disposed above the second gate insulating layer 204. The second electrode CE2 may overlap the gate electrode GE. The gate electrode GE and the second electrode CE2 may overlap with the second gate insulating layer 204 therebetween and form the storage capacitor Cst. That is, the gate electrode GE may function as a first electrode CE1 of the storage capacitor Cst.

The second electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), or copper (Cu) and may be a layer or layers including the above material.

An interlayer insulating layer 205 may cover the second electrode CE2. The interlayer insulating layer 205 may include $SiO_2$, $SiN_x$, SiON, $Al_2O_3$, $TiO_2$, $Ta_2O_5$, $HfO_2$, ZnOx, or the like. The interlayer insulating layer 205 may be a layer or layers including the above inorganic insulating material.

The buffer layer 201, the first gate insulating layer 203, the second gate insulating layer 204, and the interlayer insulating layer 205 may be referred to as an inorganic insulating layer.

The source electrode SE and the drain electrode DE may be disposed above the interlayer insulating layer 205. The source electrode SE and the drain electrode DE may each include a conductive material including Mo, Al, Cu, or Ti and may be a layer or layers including the above material.

For example, the source electrode SE and the drain electrode DE may have a multilayered structure of Ti/Al/Ti. In some embodiments, the source electrode SE or the drain electrode DE may be omitted. For example, adjacent thin-film transistors TFT may share a source area or a drain area of the semiconductor layer Act, and the source area or the drain area may function as the source electrode SE or the drain electrode DE.

A planarization insulating layer 207 may be arranged to cover the source electrode SE and the drain electrode DE. The planarization insulating layer 207 may provide a flat base surface to the pixel electrode 210 disposed thereabove.

The planarization insulating layer 207 may include an organic material or an inorganic material and have a single-layer structure or a multilayered structure. The planarization insulating layer 207 may include a general-purpose polymer, such as benzocyclobutene (BCB), polyimide, hexamethyldisiloxane (HMDSO), polymethylmethacrylate (PMMA), or polystyrene (PS), a polymer derivative having a phenol-based group, an acryl-based polymer, an imide-based polymer, an aryl-ether-based polymer, an amide-based polymer, a fluorine-based polymer, a p-xylene-based polymer, or a vinyl alcohol-based polymer. The planarization insulating layer 207 may include an inorganic insulating material, such as $SiO_x$, $SiN_x$, SiON, $Al_2O_3$, $TiO_2$, $Ta_2O_5$, $HfO_2$, or ZnOx. When the planarization insulating layer 207 is formed, chemical mechanical polishing may be performed on an upper surface of the planarization insulating layer 207 to provide a flat upper surface.

The pixel electrode 210 may be disposed above the planarization insulating layer 207. The planarization insulating layer 207 may include a via hole exposing any one of the source electrode SE and the drain electrode DE of the thin-film transistor TFT, and the pixel electrode 210 may contact the source electrode SE or the drain electrode DE through the via hole and be electrically connected to the thin-film transistor TFT.

The pixel electrode 210 may include conductive oxide, such as indium tin oxide (ITO), indium zinc oxide (IZO), zinc oxide (ZnO), indium oxide ($In_2O_3$), indium gallium oxide (IGO), or aluminum zinc oxide (AZO). The pixel electrode 210 may include a reflection layer including silver (Ag), magnesium (Mg), Al, platinum (Pt), palladium (Pd), gold (Au), nickel (Ni), neodymium (Nd), iridium (Ir), chromium (Cr), or a compound thereof. For example, the pixel electrode 210 may have a structure in which layers including ITO, IZO, ZnO, or $In_2O_3$ are arranged on/under the above reflection layer. In this case, the pixel electrode 210 may have a stack structure of ITO/Ag/ITO.

A pixel-defining layer 209 may cover edges of the pixel electrode 210 above the planarization insulating layer 207 and include a pixel opening OP1 exposing a central portion of the pixel electrode 210. Through the pixel opening OP1, the emission area of the organic light-emitting diode OLED, that is, the size and shape of the pixel PX, is defined.

The pixel-defining layer 209 may increase a distance between the edge of the pixel electrode 210 and the opposite electrode 230 arranged on the pixel electrode 210 and thus may prevent arcs, etc. from being generated on the edge of the pixel electrode 210. The pixel-defining layer 209 may include an organic insulating material, such as polyimide, polyamide, acrylic resin, BCB, HMDSO, or phenol resin, and may be formed through spin coating or the like.

The pixel-defining layer 209 may be black. The pixel-defining layer 209 may include a light-shielding material and may be black. The light-shielding material may include carbon black, a carbon nanotube, resin or paste including a black dye, metal particles such as Ni, Al, Mo, and an alloy thereof, metal oxide particles (e.g., chromium oxide), or metal nitride particles (e.g., chromium nitride), or the like. When the pixel-defining layer 209 includes the light-shielding material, external light reflection from metal structures disposed under the pixel-defining layer 209 may decrease.

An intermediate layer 220 may be arranged between the pixel electrode 210 and the opposite electrode 230. The intermediate layer 220 may include a first functional layer 221, the emission layer 222, and a second functional layer 223.

In the pixel opening OP1 of the pixel-defining layer 209, the emission layer 222 is arranged to correspond to the pixel electrode 210. The emission layer 222 may include a high-molecular-weight material or a low-molecular-weight material and emit red light, green light, blue light, or white light.

The first functional layer 221 and the second functional layer 223 may be disposed under or above the emission layer 222. In an embodiment, unlike the emission layer 222 patterned for each pixel PX, the first functional layer 221 and the second functional layer 223 may be integrally formed as a single body through the entire display area DA.

The first functional layer 221 may be a layer or layers. For example, when the first functional layer 221 includes a high-molecular-weight material, the first functional layer 221 may be a hole transport layer including poly-(3,4)-ethylene-dihydroxy thiophene (PEDOT) or polyaniline (PANI). When the first functional layer 221 includes a low-molecular-weight material, the first functional layer 221 may include a hole injection layer or a hole transport layer.

The second functional layer 223 may be selectively arranged. For example, when the first functional layer 221 and the emission layer 222 each include a high-molecular-weight material, it may be preferable to form the second functional layer 223. The second functional layer 223 may be a layer or layers. The second functional layer 223 may include an electron transport layer or an electron injection layer. In some embodiments, at least one of the hole injection layer, the hole transport layer, the electron transport layer, and the electron injection layer may be omitted.

The opposite electrode 230 may include a conductive material having a relatively low work function. For example, the opposite electrode 230 may include a transparent (or translucent) layer including Ag, Mg, Al, Ni, Cr, Li, Ca, or an alloy thereof. Alternatively, the opposite electrode 230 may further include a layer including ITO, IZO, ZnO, or $In_2O_3$ on the transparent (or translucent) layer including the above material. In an embodiment, the opposite electrode 230 may include Ag and Mg.

The stack structure of the pixel electrode 210, the intermediate layer 220, and the opposite electrode 230 which are sequentially stacked may form the organic light-emitting diode OLED.

In an embodiment, a capping layer (not shown) may be disposed above the organic light-emitting diode OLED. The capping layer may be configured to improve the emission efficiency of the organic light-emitting diode OLED according to the principle of constructive interference. The capping layer may include an organic capping layer including an organic material, an inorganic capping layer including an inorganic material, and a composite capping layer including an organic material and an inorganic material.

The encapsulation layer 300 may be disposed above the organic light-emitting diode OLED. In an embodiment, the encapsulation layer 300 may include at least one inorganic encapsulation layer and at least one organic encapsulation layer. For example, the encapsulation layer 300 may include a first inorganic encapsulation layer 310, a second inorganic encapsulation layer 330, and an organic encapsulation layer 320 arranged therebetween.

The first inorganic encapsulation layer 310 and the second inorganic encapsulation layer 330 may each include at least one inorganic insulating material. The inorganic insulating material may include $Al_2O_3$, $TiO_2$, $Ta_2O_5$, $HfO_2$, ZnOx, $SiO_x$, $SiN_x$, or SiON. The first inorganic encapsulation layer 310 and the second inorganic encapsulation layer 330 may be formed through CVD.

The organic encapsulation layer 320 may include polyethylene terephthalate, polyethylene naphthalate, polycarbonate, polyimide, polyethylene sulfonate, polyoxymethylene, polyarylate, HMDSO, acryl-based resin, or a combination thereof.

The encapsulation layer 300 may entirely cover the display area DA and extend to the non-display area NDA, thus covering at least a portion of the non-display area NDA.

As described above, the encapsulation layer 300 may include the organic encapsulation layer 320 and provide a planarized base surface. Therefore, even though components of the touch sensor layer 400 are formed through a continuous process, the error rate may decrease.

The touch sensor layer 400 may have a multilayered structure. The touch sensor layer 400 includes a sensing electrode, a sensing signal line connected to the sensing electrode, a driving electrode, a driving signal line connected to the driving electrode, and at least one insulating layer. The touch sensor included in the touch sensor layer 400 may sense an external input in, for example, a capacitive manner.

The touch sensor layer 400 may include a first touch insulating layer 410, a first touch conductive layer MTL1, a second touch insulating layer 420, a second touch conductive layer MTL2, and a third touch insulating layer 430.

The first touch insulating layer 410 may be directly disposed on the encapsulation layer 300. The first touch insulating layer 410 may include an inorganic material or an organic material and be a layer or layers.

The first touch insulating layer 410 may prevent damage to the encapsulation layer 300 and block an interference signal that may be generated while the touch sensor layer 400 is driven.

For example, the first touch conductive layer MTL1 and the second touch conductive layer MTL2 may each have a single-layer structure or a multilayered stack structure. A conductive layer of the single-layer structure may include a metal layer or a transparent conductive layer. The metal layer may include Mo, Ag, Ti, Cu, Al, and an alloy thereof. The transparent conductive layer may include transparent conductive oxide, such as ITO, IZO, ZnO, or indium tin zinc oxide (ITZO). Alternatively, the transparent conductive layer may include a conductive polymer such as PEDOT, metal nanowire, graphene, or the like.

A conductive layer of the multilayered structure may include a plurality of metal layers. The metal layers may have, for example, a three-layer structure of Ti/Al/Ti. The conductive layers of the multilayered structure may include at least one metal layer and at least one transparent conductive layer.

The first touch conductive layer MTL1 and the second touch conductive layer MTL2 may each include a plurality of patterns. The first touch conductive layer MTL1 may include first conductive patterns, and the second touch conductive layer MTL2 may include second conductive patterns. The first conductive patterns and the second conductive patterns may form the touch sensor.

The first touch conductive layer MTL1 and the second touch conductive layer MTL2 may be electrically connected to each other through a contact hole. In an embodiment, the first touch conductive layer MTL1 and the second touch conductive layer MTL2 may each have a mesh structure allowing light emitted from the organic light-emitting diode OLED to pass through. In this case, the first touch conductive layer MTL1 and the second touch conductive layer MTL2 may not overlap the emission area EA.

The second touch insulating layer 420 may include an organic material. The organic material may include at least one selected from the group consisting of acryl-based resin, methacrylic resin, polyisoprene, vinyl-based resin, epoxy-based resin, urethane-based resin, cellulose-based resin, and perylene-based resin. The second touch insulating layer 420 may further include an inorganic material. The inorganic material may include at least one selected from the group consisting of $SiN_x$, aluminum nitride (AlN), zirconium nitride (ZrN), titanium nitride (TiN), hafnium nitride (HfN), tantalum nitride (TaN), $SiO_x$, $Al_2O_3$, $TiO_2$, $SnO_2$, cerium oxide ($CeO_2$), and SiON.

The third touch insulating layer 430 may be disposed above the second touch conductive layer MTL2. The third touch insulating layer 430 may be a layer or layers. The third touch insulating layer 430 may include an organic material, an inorganic material, or a composite material.

FIG. 5 shows that the touch sensor layer 400 directly formed on the encapsulation layer 300 but it is not limited thereto. In another embodiment, the touch sensor layer 400 may be included as a functional module separated from the display panel 10 and may be coupled to the display panel 10 by an optical clear adhesive OCA.

Figure 6:
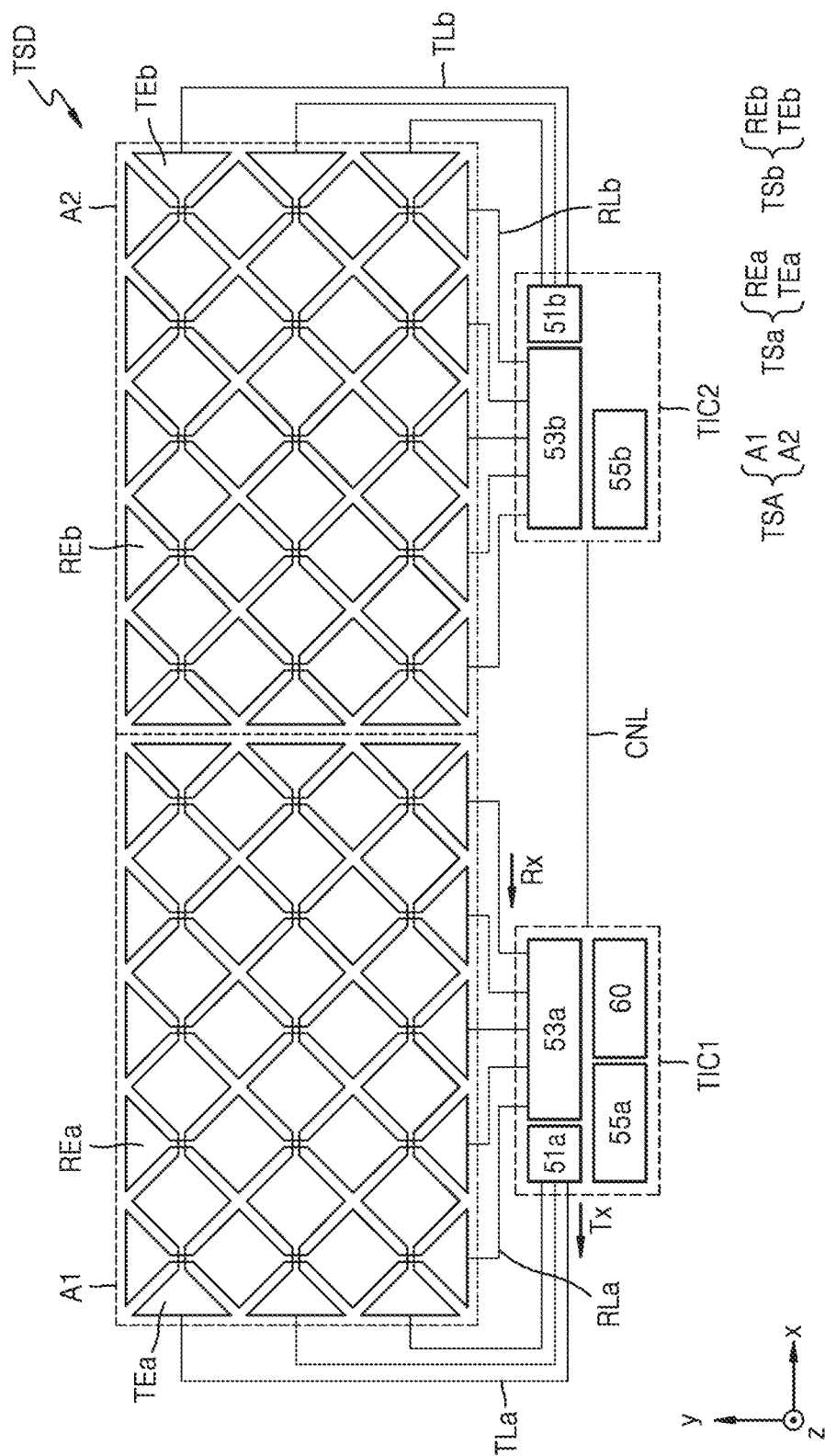
FIG. 6 is a schematic diagram of a touch sensing device included in a display apparatus, according to an embodiment.

FIG. 6 is a schematic diagram of a touch sensing device included in a display apparatus, according to an embodiment.

Referring to FIG. 6, a touch sensing area TSA may include a plurality of areas, and a touch sensing device TSD may include a plurality of touch sensors respectively corresponding to the areas, and a plurality of touch integrated circuits respectively controlling the touch sensors.

For example, the touch sensing area TSA may include a first area A1 and a second area A2. A first touch sensor TSa may overlap the display area (DA, see FIG. 1). In an embodiment, as shown in FIG. 6, the first area A1 and the second area A2 may be adjacent to each other in a first direction (an x direction). In another embodiment, the first area A1 and the second area A2 may be adjacent to each other in a second direction (a y direction). Alternatively, the first area A1 and the second area A2 may be spaced apart from each other.

The touch sensing device TSD may include the first touch sensor TSa arranged in the first area A1, a second touch sensor TSb arranged in the second area A2, a first touch integrated circuit TIC1 connected to the first touch sensor TSa, and a second touch integrated circuit TIC2 connected to the second touch sensor TSb.

The first touch sensor TSa may include a plurality of first driving electrodes TEa and a plurality of first sensing electrodes REa arranged in the first area A1. The first driving electrodes TEa may respectively extend in the first direction (the x direction) and be spaced apart from each other in the second direction (the y direction). The first sensing electrodes REa may respectively extend in the second direction (the y direction) and be spaced apart from each other in the first direction (the x direction). For example, the first sensing electrodes REa may be arranged to cross the first driving electrodes TEa in the plan view.

The second touch sensor TSb may include a plurality of second driving electrodes TEb and a plurality of second sensing electrodes REb arranged in the second area A2. The second driving electrodes TEb may respectively extend in the first direction (the x direction) and be spaced apart from each other in the second direction (the y direction). The second sensing electrodes REb may respectively extend in the second direction (the y direction) and be spaced apart from each other in the first direction (the x direction). The second sensing electrodes REb may be arranged to cross the first driving electrodes TEa in the plan view.

The first touch integrated circuit TIC1 and the second touch integrated circuit TIC2 may respectively correspond to the integrated circuits 40 of FIG. 1. In an embodiment, the first touch integrated circuit TIC1 and the second touch integrated circuit TIC2 may be mounted on the circuit board (30, sec FIG. 1).

The first touch integrated circuit TIC1 may include a first signal driver 51*a*, a first signal sensor 53*a*, and a first memory 55*a*. The first signal driver 51*a* may be electrically connected to the first driving electrodes TEa through first driving signal lines TLa and configured to apply driving signals Tx to the first driving electrodes TEa. The first signal sensor 53*a* may be electrically connected to the first sensing electrodes REa through first sensing signal lines RLa and receive sensing signals Rx from the first sensing electrodes REa to convert the same into digital signals.

The second touch integrated circuit TIC2 may include a second signal driver 51*b*, a second signal sensor 53*b*, and a second memory 55*b*. The second signal driver 51*b* may be electrically connected to the second driving electrodes TEb through the second driving signal lines TLb and configured to apply driving signals Tx to the second driving electrodes TEb. The second signal sensor 53*b* may be electrically connected to the second sensing electrodes REb through second sensing signal lines RLb and receive sensing signals Rx from the second sensing electrodes REb to convert the same into digital signals.

The first signal sensor 53*a* and the second signal sensor 53*b* may each include an analog front end (AFE) configured to receive an analog signal and an analog digital converter (ADC) configured to convert the received analog signal into a digital signal. The first memory 55*a* may store software, an algorithm, etc. for driving the first touch integrated circuit TIC1, and the second memory 55*b* may store software, an algorithm, etc. for driving the second touch integrated circuit TIC2. The first memory 55*a* and the second memory 55*b* may each include random access memory (RAM) or flash memory.

A control unit 60 may control the operation of the first touch integrated circuit TIC1 and the second touch integrated circuit TIC2 and determine the occurrence of touch inputs and touch locations based on the sensing signals transmitted from the first touch integrated circuit TIC1 and the second touch integrated circuit TIC2. The control unit 60 may include a microcontroller unit (MCU) or a central processing unit (CPU).

In an embodiment, the control unit 60 may be included in any one of the touch integrated circuits and provided as a single chip. As shown in FIG. 6, for example, the first touch integrated circuit TIC1 may be provided as a single chip including the control unit 60. In this case, the first touch integrated circuit TIC1 may function as a master, and the second touch integrated circuit TIC2 may function as a slave. In another embodiment, the control unit 60 may be a single chip separated from the touch integrated circuits.

The first touch integrated circuit TIC1 may sense a variation in mutual capacitance between the first driving electrodes TEa and the first sensing electrodes REa, a variation in self-capacitance in the first driving electrodes TEa, or a variation in self-capacitance in the first sensing electrodes REa. Because the first driving electrodes TEa and the first sensing electrodes REa are arranged in the entire first area A1, it may be described that the first touch integrated circuit TIC1 senses the variation in the mutual capacitance or in the self-capacitance in the first area A1. The first touch integrated circuit TIC1 may generate a first sensing signal based on the variation in the mutual capacitance or the self-capacitance in the first area A1 and transmit the generated first sensing signal to the control unit 60.

The second touch integrated circuit TIC2 may sense a variation in mutual capacitance between the second driving electrodes TEb and the second sensing electrodes REb, a variation in self-capacitance in the second driving electrodes TEb, or a variation in self-capacitance in the second sensing electrodes REb. Because the second driving electrodes TEb and the second sensing electrodes REb are arranged in the entire second area A2, it may be described that the second touch integrated circuit TIC2 senses the variation in mutual capacitance or in self-capacitance in the second area A2. When the second touch integrated circuit TIC2 functions as a slave, the second touch integrated circuit TIC2 may generate a second sensing signal based on the variation in the mutual capacitance or the self-capacitance in the second area A2 and transmit the generated second sensing signal to the control unit 60 of the first touch integrated circuit TIC1 through a connection line CNL.

The control unit 60 may determine the occurrence of touch inputs and the touch locations based on the first sensing signal and the second sensing signal and control operation modes of the first touch integrated circuit TIC1 and the second touch integrated circuit TIC2.

Figure 7A:
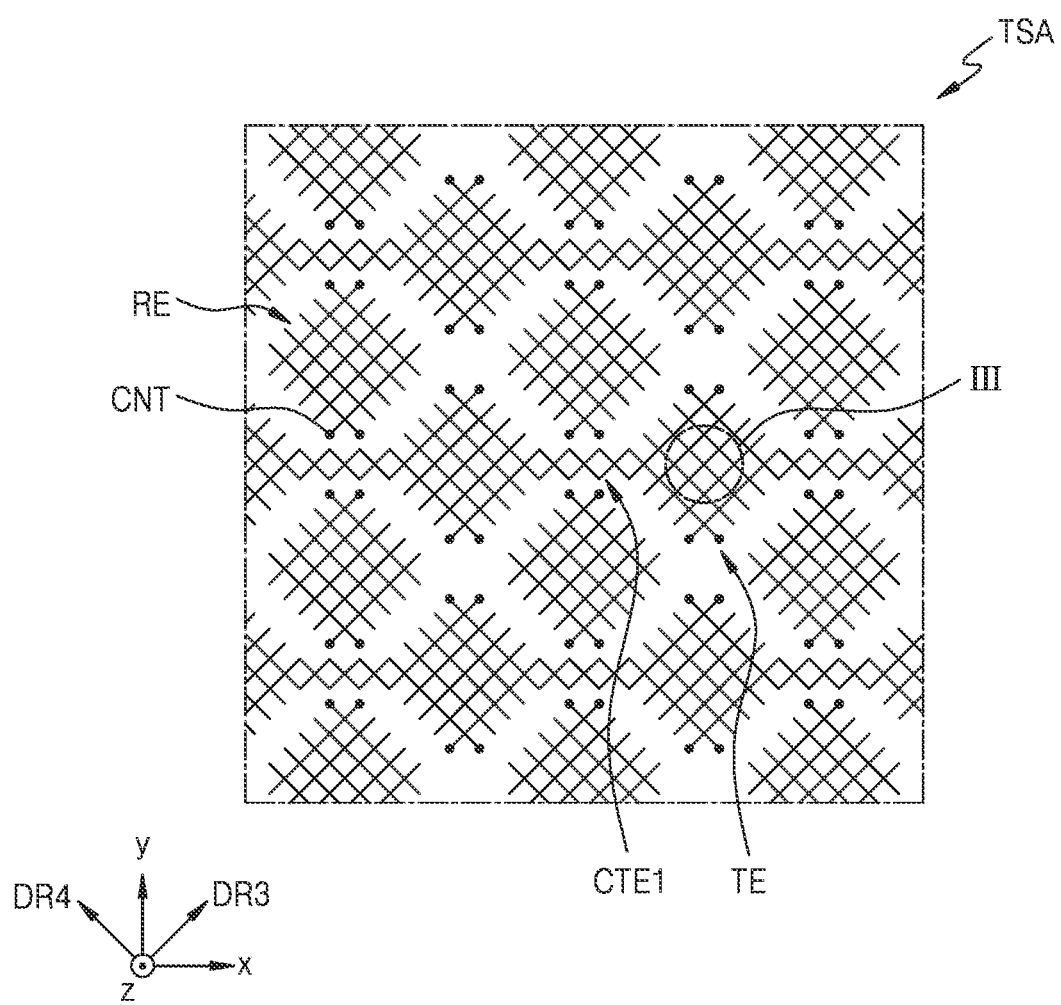
FIGS. 7A, 7B, and 7C are plan views respectively showing a portion of a touch sensing area.
Figure 7B:
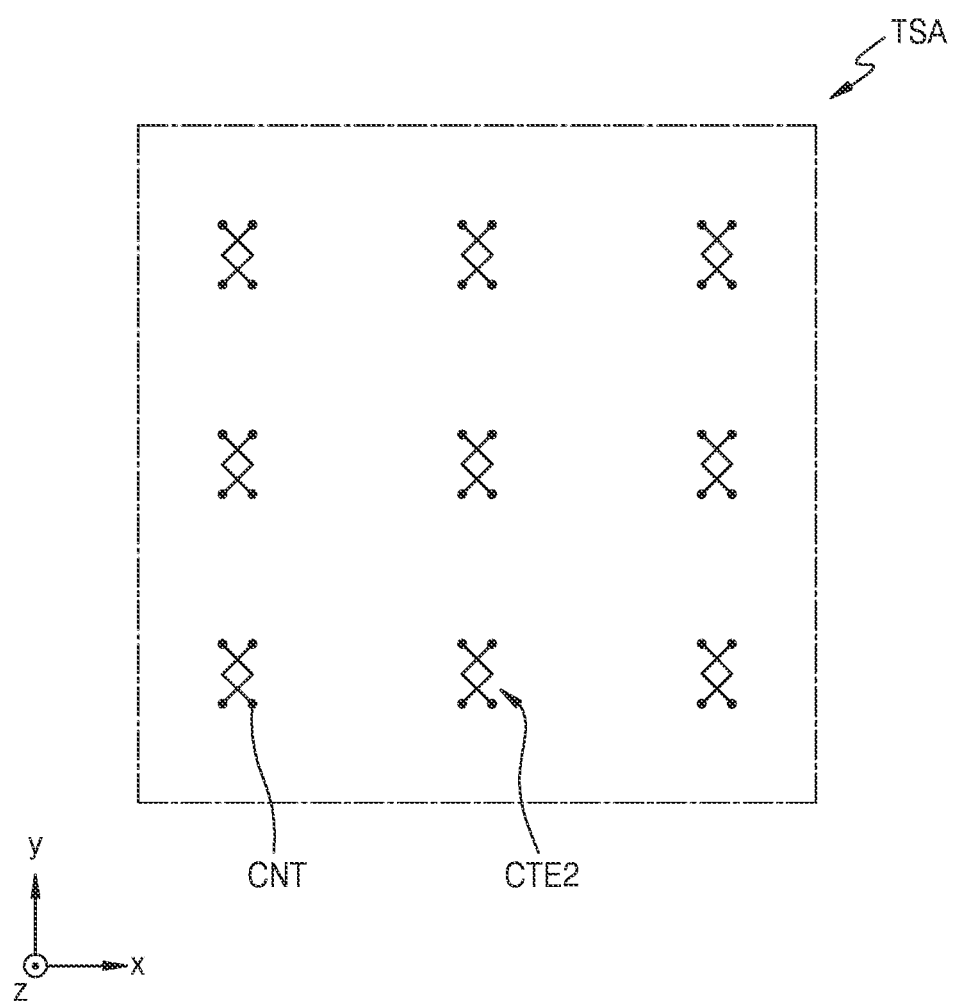
Figure 7C:
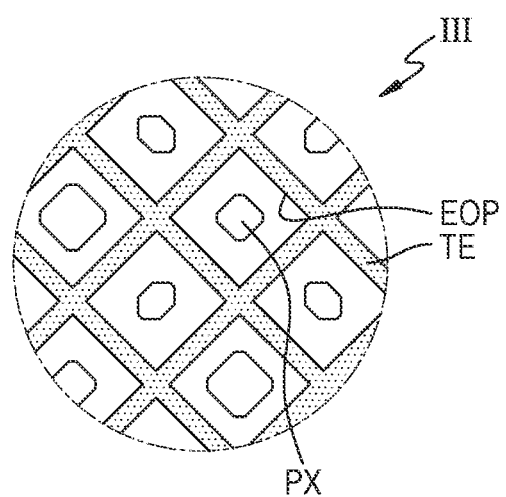

FIGS. 7A to 7C are plan views respectively showing a portion of a touch sensing area. FIG. 7A shows the first touch conductive layer MTL1 (see FIG. 5) arranged in the touch sensing area TSA, and FIG. 7B shows the second touch conductive layer MTL2 (see FIG. 5) arranged in the touch sensing area TSA. FIG. 7C is a plan view of an enlarged region III of FIG. 7A.

Referring to FIGS. 7A and 7B, the driving electrodes TE and the sensing electrodes RE forming the touch sensor may be arranged in the touch sensing area TSA. The driving electrode TE may correspond to the first driving electrode TEa or the second driving electrode TEb of FIG. 6, and the sensing electrode RE may correspond to the first sensing electrode REa or the second sensing electrode REb of FIG. 6.

The driving electrodes TE may respectively extend in the first direction (the x direction) and be spaced apart from each other in the second direction (the y direction). The driving electrodes TE may include electrode portions arranged on the first conductive layer and first connection electrodes CTE1 connecting the electrode portions that are adjacent to each other in the first direction (the x direction). The first connection electrodes CTE1 may be formed integrally with the electrode portions of the driving electrodes TE.

The sensing electrodes RE may include electrode portions arranged on the first conductive layer and second connection electrodes CTE2 arranged on the second conductive layer and connecting the electrode portions that are adjacent to each other in the second direction (the y direction). The second connection electrodes CTE2 may contact the electrode portions of the sensing electrodes RE through contact holes CNT.

In the plan view, the first connection electrodes CTE1 and the second connection electrodes CTE2 may cross each other. Because an insulating layer (e.g., a second touch insulating layer) is arranged between the first connection electrode CTE1 and the second connection electrode CTE2, the first connection electrode CTE1 and the second connection electrode CTE2, which overlap each other, may form a sort of capacitor.

The driving electrodes TE and the sensing electrodes RE may each have a mesh pattern (or a grid or a lattice). The mesh pattern may be formed as metal patterns, extending in a third direction DR3 crossing the first direction (the x direction) and the second direction (the y direction), and cross metal patterns extending in a fourth direction DR4 crossing the third direction DR3. Therefore, the driving electrodes TE and the sensing electrodes RE may include a plurality of electrode openings EOP.

Referring to FIG. 7C, the driving electrode TE may have a mesh pattern. The driving electrode TE may define a plurality of electrode openings EOP located in the lattice of the mesh pattern. Each electrode opening EOP may overlap the pixel PX. In other words, the emission area (EA, see FIG. 5) of the pixel PX may be arranged on the inner side of each electrode opening EOP.

The sensing electrode RE may have a mesh pattern that is the same as or similar to that of the driving electrode TE of FIG. 7C. When the driving electrodes TE and the sensing electrodes RE include metal layers, light emitted from the pixels PX may penetrate the touch sensor layer (400, see FIG. 5) through the electrode openings EOP.

In an embodiment, the electrode portions of the driving electrodes TE and the sensing electrodes RE of FIG. 7A may be arranged on the second touch conductive layer (MTL2, see FIG. 5), and the second connection electrodes CTE2 of the sensing electrodes RE of FIG. 7B may be arranged on the first touch conductive layer (MTL1, see FIG. 5).

In an embodiment, the driving electrodes TE and the sensing electrodes RE may have surface patterns including transparent conductive materials.

Figure 8:
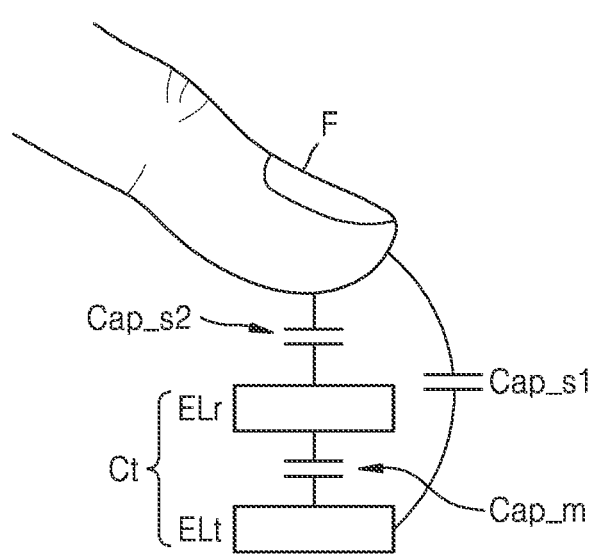
FIG. 8 is a diagram for explaining a sensing principle of a display apparatus, according to an embodiment.

FIG. 8 is a diagram for explaining a sensing principle of a display apparatus, according to an embodiment.

Referring to FIG. 8, a touch sensor may include a touch capacitor Ct. The touch capacitor Ct may include a first electrode ELt and a second electrode ELr overlapping the first electrode ELt. For example, the first electrode ELt may correspond to the first connection electrode CTE1 of FIG. 7A, and the second electrode ELr may correspond to the second connection electrode CTE2 of FIG. 7B.

Mutual capacitance Cap_m may be generated between the first electrode ELt and the second electrode ELr which overlap each other with an insulating layer therebetween in the plan view.

When a contact target F, such as a finger or a stylus, contacts an upper surface of the touch capacitor Ct, the mutual capacitance Cap_m between the first electrode ELt and the second electrode ELr may change. A variation in the mutual capacitance Cap_m may be sensed by applying the driving signal (Tx, see FIG. 6) to the touch capacitor Ct through a driving electrode electrically connected to the first electrode ELt and applying the sensing signal (Rx, see FIG. 6) received through a sensing electrode electrically connected to the second electrode ELr. Because the location of the touch capacitor Ct may be specified, the occurrence of touch inputs and touch locations (touch coordinates) may be determined based on the variation in the mutual capacitance Cap_m.

When the contact target F contacts or comes close to the upper surface of the touch capacitor Ct, first self-capacitance Cap_s1 may be generated between the first electrode ELt and the contact target F. Likewise, second self-capacitance Cap_s2 may be generated between the second electrode ELr and the contact target F. Based on a variation in the first self-capacitance Cap_s1 or the second self-capacitance Cap_s2, the approach of the contact target F and the occurrence of touch inputs may be determined.

According to a sensing mode, the touch integrated circuit may sense some or all of the mutual capacitance Cap_m, the first self-capacitance Cap_s1, and the second self-capacitance Cap_s2.

Figure 9:
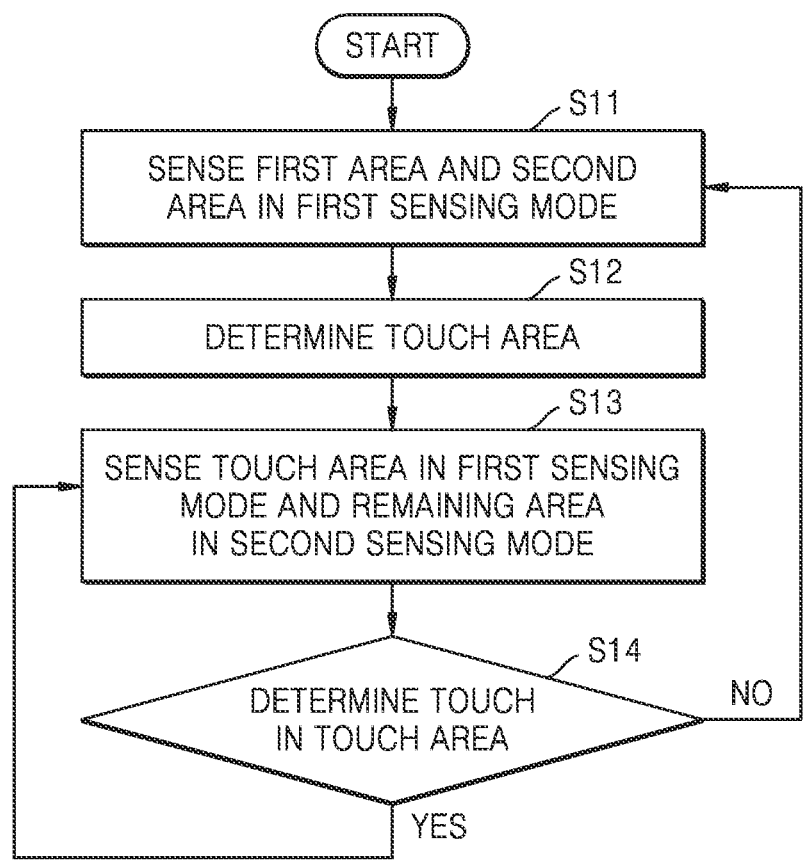
FIG. 9 is a flowchart for explaining a touch determination method of a display apparatus, according to an embodiment.
Figure 10A:
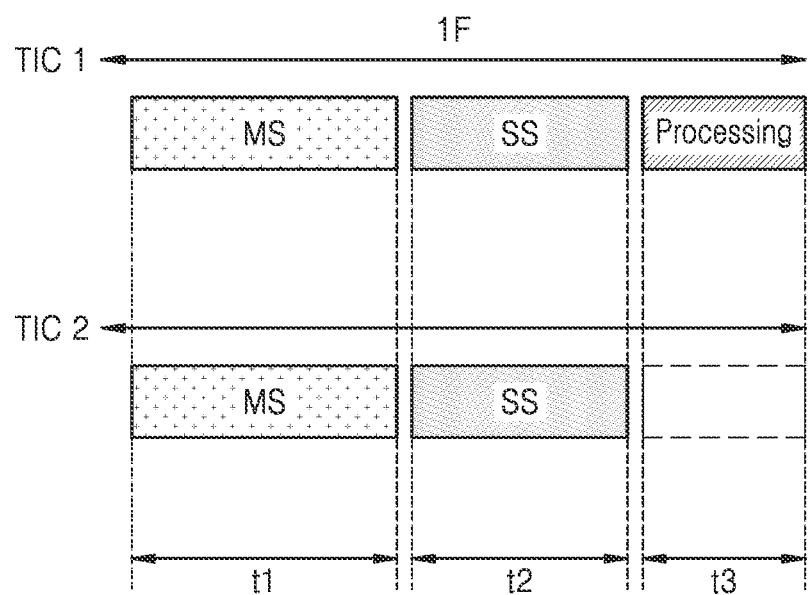
FIGS. 10A and 10B are diagrams for explaining a sensing process in each operation of a display apparatus, according to an embodiment.
Figure 10B:
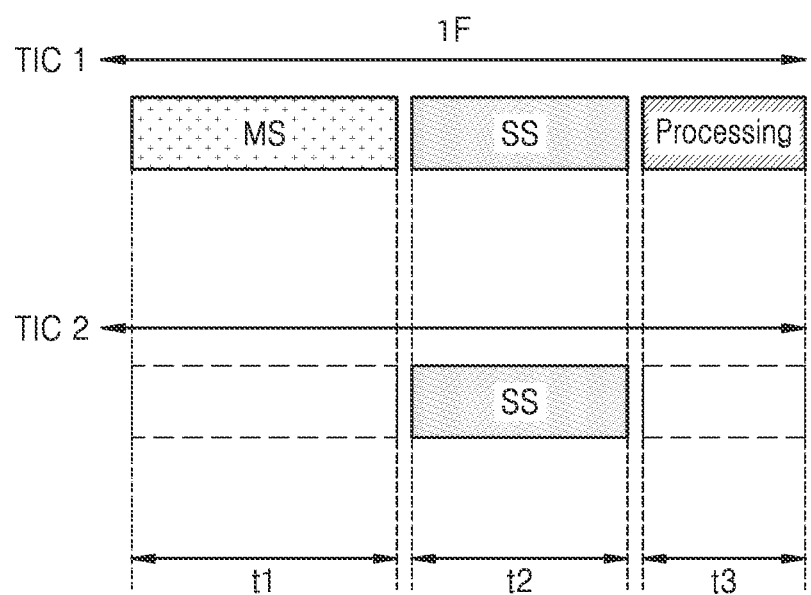

FIG. 9 is a flowchart for explaining a touch determination method of a display apparatus, according to an embodiment, and FIGS. 10A and 10B are diagrams for explaining a sensing process in each operation of the display apparatus, according to an embodiment.

The display apparatus according to an embodiment may include the touch sensing device TSD described above with reference to FIG. 6, and the touch sensing device TSD may sense the touch sensing area TSA to determine the occurrence of touch inputs and touch locations (touch coordinates) of the contact target. Depending on the contact time and motions of the contact target, a touch action and a drawing action may be distinguished. For example, the touch action may indicate that the contact target is in contact with a point in the touch sensing area TSA. The drawing action may refer to an action in which the contact target moves from one point to another point while maintaining its contact with the touch sensing area TSA.

The touch sensing device TSD may include a first touch sensor TSa arranged in the first area A1, a first touch integrated circuit TIC1 connected to the first touch sensor TSa, a second touch sensor TSb arranged in the second area A2, and a second touch integrated circuit TIC2 connected to the second touch sensor TSb. Hereinafter, a case where the control unit 60 is mounted on the first touch integrated circuit TIC1 is mainly described.

Referring to FIGS. 6, 9, 10A, and 10B, the touch determination method of the touch sensing device TSD may include operation S11 of sensing a first area and a second area in a first sensing mode, operation S12 of determining a touch area, operation S13 of sensing the touch area in the first sensing mode and the remaining area in a second sensing mode, and operation S14 of determining touches in the touch area.

In operation S11 of sensing the first area and the second area in the first sensing mode, the control unit 60 may control the first touch integrated circuit TIC1 and the second touch integrated circuit TIC2 to sense the first area A1 and the second area A2 in the first sensing mode. In an initial state in which there is no contact with the contact target, the control unit 60 may control the first touch integrated circuit TIC1 and the second touch integrated circuit TIC2 to sense the first area A1 and the second area A2 in the first sensing mode.

As shown in FIG. 10A, during operation S11 of sensing the first area and the second area in the first sensing mode, the first touch integrated circuit TIC1 and the second touch integrated circuit TIC2 may each perform, in each frame 1F, mutual capacitance variation sensing MS in a corresponding area and self-capacitance variation sensing SS in the corresponding area and may generate a first sensing signal and a second sensing signal and transmit the same to the control unit 60, and the control unit 60 may determine the occurrence of touch inputs and the touch locations based on the first sensing signal and the second sensing signal.

Here, the sensing of the areas respectively corresponding to the first touch integrated circuit TIC1 and the second touch integrated circuit TIC2 may indicate that the first touch integrated circuit TIC1 generates the first sensing signal based on the variation in the mutual capacitance or the self-capacitance in the first touch sensor TSa arranged in the first area A1 and that the second touch integrated circuit TIC2 generates the second sensing signal based on the variation in the mutual capacitance or the self-capacitance in the second touch sensor TSb arranged in the second area A2.

In the first sensing mode, one frame 1F may include a first time period t1 in which the mutual capacitance variation sensing MS is performed, a second time period t2 in which the self-capacitance variation sensing SS is performed, and a third time period t3 in which the control unit 60 processes the first sensing signal and the second sensing signal. In the third time period t3, the first sensing signal and the second sensing signal are processed only in the first touch integrated circuit TIC1 including the control unit 60, and the second touch integrated circuit TIC2 may be in an IDLE state in the third time period t3.

In operation S12 of determining the touch area, the control unit 60 may select a touch area including a touch location of the contact target, based on the first sensing signal and the second sensing signal that are transmitted from the first touch integrated circuit TIC1 and the second touch integrated circuit TIC2. An area contacting the contact target among the first area A1 and the second area A2 may be selected as the touch area. Hereinafter, an example in which the first area A1 is selected as the touch area and the second area A2 is the remaining area (or a non-touch area) is described.

As shown in FIG. 10B, in operation S13 of sensing the touch area in the first sensing mode and the remaining area in the second sensing mode, the control unit 60 may control the first touch integrated circuit TIC1 and the second touch integrated circuit TIC2 to sense the touch area in the first sensing mode and the remaining area in the second sensing mode. In an embodiment, the touch sensing device TSD may primarily sense the touch area.

In the second sensing mode, one frame 1F may include a first time period t1 in which sensing is not performed, a second time period t2 in which the self-capacitance variation sensing SS is performed, and a third time period t3 in which the control unit 60 processes the first sensing signal and the second sensing signal. In the first time period t1 in which the first touch integrated circuit TIC1 performs the mutual capacitance variation sensing MS, the second touch integrated circuit TIC2 may be in the IDLE state.

For example, when the first area A1 is the touch area including the touch location and the second area A2 is the remaining area, the first touch integrated circuit TIC1 may sense the first area A1 in the first sensing mode, and the second touch integrated circuit TIC2 may sense the second area A2 in the second sensing mode. Therefore, in each frame 1F, the first touch integrated circuit TIC1 may transmit, to the control unit 60, the first sensing signal generated by performing the mutual capacitance variation sensing MS and the self-capacitance variation sensing SS for the first area A1, the second touch integrated circuit TIC2 may transmit, to the control unit 60, the second sensing signal generated by performing the self-capacitance variation sensing SS for the second area A2, and the control unit 60 may determine the occurrence of touch inputs and the touch locations based on the first sensing signal and the second sensing signal.

That is, the touch sensing device TSD may expect that a next touch of the contact target will be in the touch area and perform the mutual capacitance variation sensing MS and the self-capacitance variation sensing SS only for the touch area. The touch sensing device TSD may not perform the mutual capacitance variation sensing MS for the remaining area to reduce power consumption of the touch sensing device TSD but may continue to perform the self-capacitance variation sensing SS.

In operation S14 of determining touches in the touch area, the control unit 60 may determine whether the contact target touches the touch area. When it is determined that a touch exists in the touch area, that is, when the contact target touches the touch area, operations may be repeated by returning to operation S13 of sensing the touch area in the first sensing mode and the remaining area in the second sensing mode.

When it is determined that there is no touch, that is, when the contact target does not touch the touch area, respective operations may be repeated by returning to operation S11 of sensing the first area and the second area in the first sensing mode.

Figure 11:
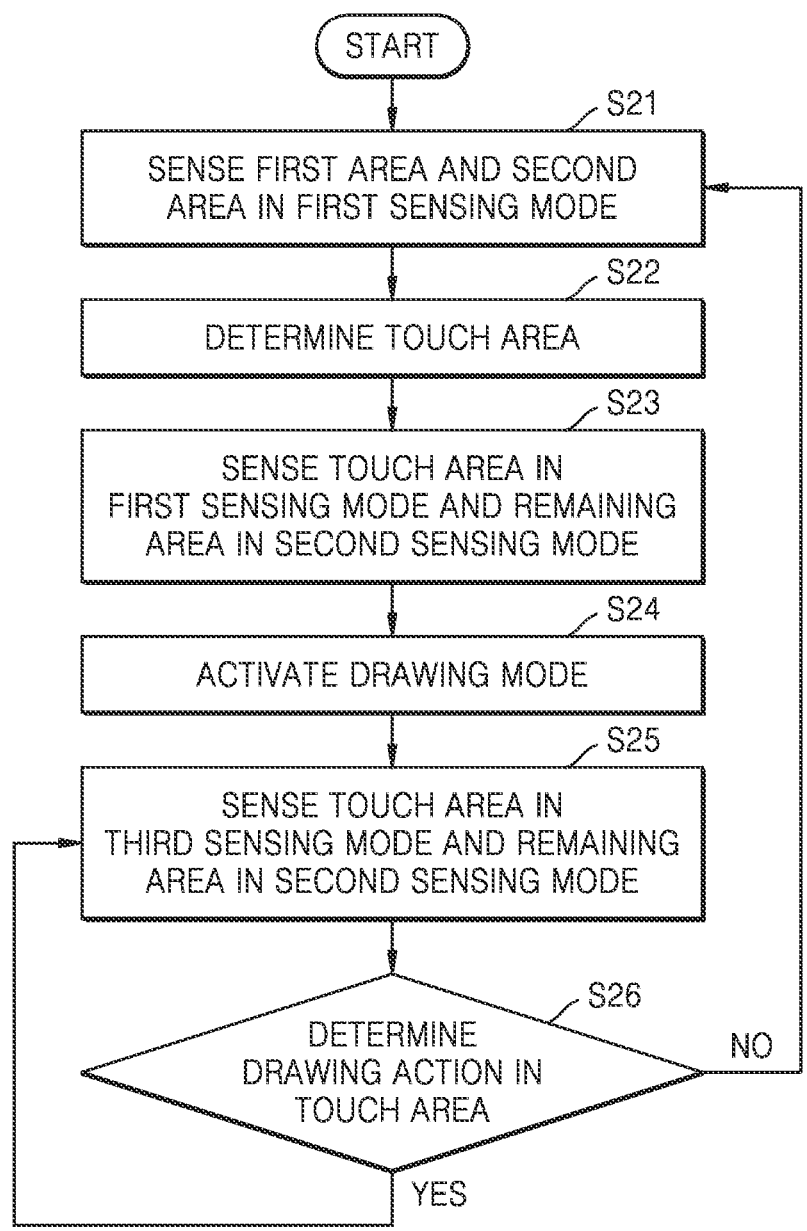
FIG. 11 is a flowchart for explaining a drawing determination method of a display apparatus, according to an embodiment.
Figure 12A:
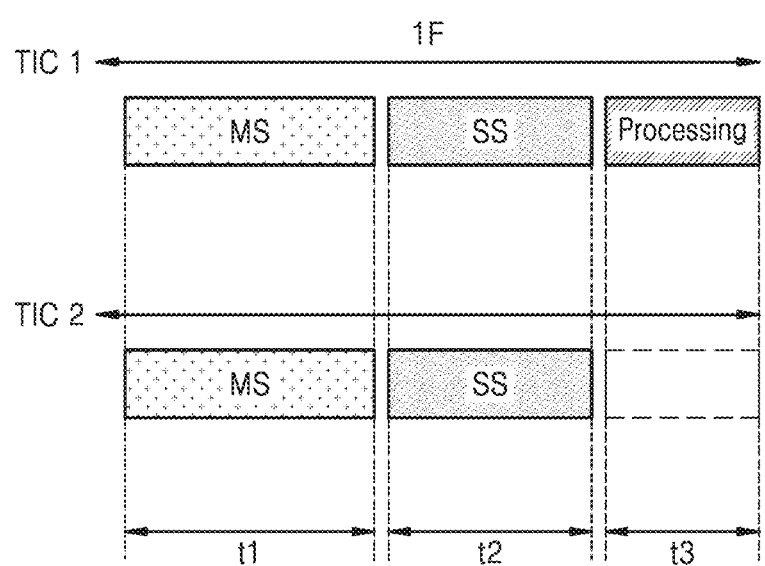
FIGS. 12A, 12B, and 12C are diagrams for explaining a sensing process in each operation of a display apparatus, according to an embodiment.
Figure 12B:
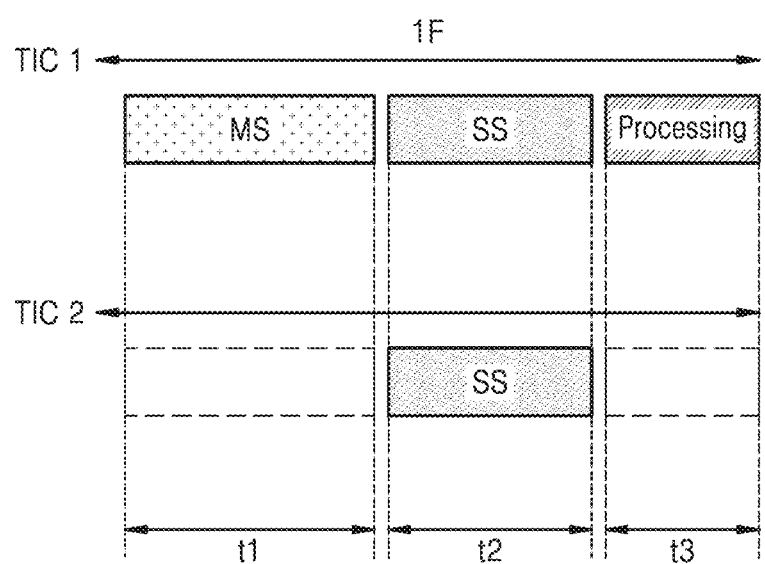
Figure 12C:
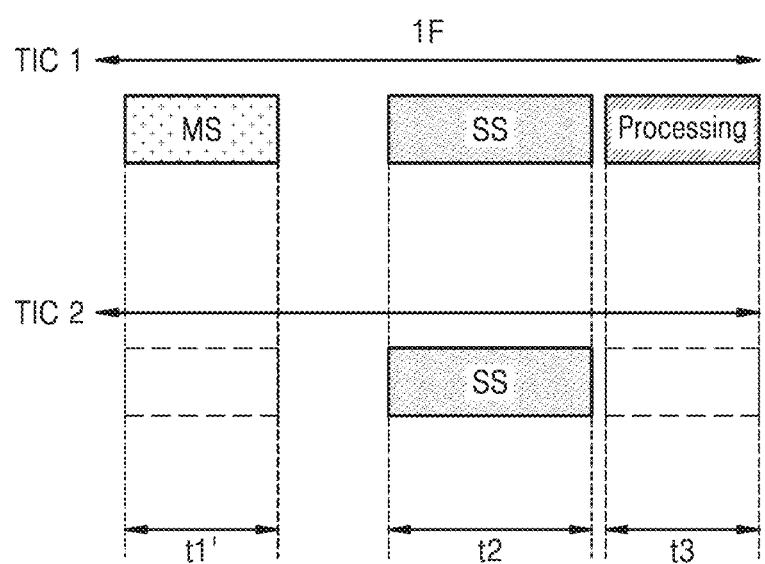

FIG. 11 is a flowchart for explaining a drawing determination method of a display apparatus, according to an embodiment, and FIGS. 12A to 12C are diagrams for explaining a sensing process in each operation of the display apparatus, according to an embodiment.

Referring to FIGS. 6, 11, 12A, 12B, and 12C, the display apparatus may include the touch sensing device TSD, and the drawing determination method of the touch sensing device TSD may include operation S21 of sensing a first area and a second area in a first sensing mode, operation S22 of determining a touch area, operation S23 of sensing the touch area in the first sensing mode and the remaining area in a second sensing mode, operation S24 of activating a drawing mode, operation S25 of sensing the touch area in a third sensing mode and the remaining area in the second sensing mode, and operation S26 of determining a drawing action in the touch area.

In operation S21 of sensing the first area and the second area in the first sensing mode, the control unit 60 may control the first touch integrated circuit TIC1 and the second touch integrated circuit TIC2 to sense the first area A1 and the second area A2 in the first sensing mode.

As shown in FIG. 12A, in operation S21 of sensing the first area A1 and the second area A2 in the first sensing mode, the first touch integrated circuit TIC1 and the second touch integrated circuit TIC2 may each perform, in each frame 1F, mutual capacitance variation sensing MS in a corresponding area and self-capacitance variation sensing SS in the corresponding area and may generate a first sensing signal and a second sensing signal and transmit the same to the control unit 60, and the control unit 60 may determine the occurrence of touch inputs and the touch locations based on the first sensing signal and the second sensing signal.

In operation S22 of determining the touch area, the control unit 60 may select a touch area including a touch location of the contact target, based on the first sensing signal and the second sensing signal that are transmitted from the first touch integrated circuit TIC1 and the second touch integrated circuit TIC2. An area contacting the contact target among the first area A1 and the second area A2 may be selected as the touch area. Hereinafter, an example in which the first area A1 is selected as the touch area and the second area A2 is the remaining area (or a non-touch area) is described.

As shown in FIG. 12B, in operation S23 of sensing the touch area in the first sensing mode and the remaining area in the second sensing mode, the control unit 60 may control the first touch integrated circuit TIC1 and the second touch integrated circuit TIC2 to sense the touch area in the first sensing mode and the remaining area in the second sensing mode. In an embodiment, the touch sensing device TSD may primarily sense the touch area.

For example, the first touch integrated circuit TIC1 may generate the first sensing signal by performing the mutual capacitance variation sensing MS and the self-capacitance variation sensing SS for the first area A1, the second touch integrated circuit TIC2 may generate the second sensing signal by performing the self-capacitance variation sensing SS for the second area A2, and the control unit 60 may determine the occurrence of touch inputs and the touch locations based on the first sensing signal and the second sensing signal.

In operation S24 of activating the drawing mode, the control unit 60 may activate the drawing mode when the contact target maintains a touch for a preset period of time, based on the first sensing signal and the second sensing signal that are transmitted from the first touch integrated circuit TIC1 and the second touch integrated circuit TIC2.

As shown in FIG. 12C, in operation S25 of sensing the touch area in the third sensing mode and the remaining area in the second sensing mode, the control unit 60 may control the first touch integrated circuit TIC1 and the second touch integrated circuit TIC2 to sense the touch area in the third sensing mode and the remaining area in the second sensing mode.

In the third sensing mode, one frame 1F may include a 1' time period t1' in which mutual capacitance variation sensing MS is performed for a first sub-area determined with respect to the touch location, the second time period t2 in which self-capacitance variation sensing SS is performed for the touch area, and the third time period t3 in which the control unit 60 processes the first sensing signal and the second sensing signal.

In this case, the touch location that becomes a reference may be determined in a previous frame. The first sub-area may be determined to have the touch location at the center of the first sub-area. That is, because the mutual capacitance variation sensing MS is performed only for the first sub-area that is a portion of the touch area, the 1' time period t1' of the third sensing mode may be less than the first time period t1 in which the mutual capacitance variation sensing MS is performed for the entire touch area.

For example, in each frame 1F, the first touch integrated circuit TIC1 may transmit, to the control unit 60, the first sensing signal that is generated by performing the mutual capacitance variation sensing MS for a portion of the first area A1 and the self-capacitance variation sensing SS for the entire first area A1. The second touch integrated circuit TIC2 may transmit, to the control unit 60, the second sensing signal generated by performing the self-capacitance variation sensing SS for the second area A2. The control unit 60 may determine the occurrence of touch inputs and the touch locations based on the first sensing signal and the second sensing signal. The second touch integrated circuit TIC2 may be in the IDLE state for the 1' time period t1' in which the first touch integrated circuit TIC1 performs the mutual capacitance variation sensing MS.

The touch sensing device TSD may expect that the touch location of the contact target will be moved within the first sub-area that is adjacent to a touch location in a previous frame and perform the mutual capacitance variation sensing MS only for the first sub-area, thus reducing the power consumption. Also, as the 1' time period t1' becomes shorter than the first time period t1, the touch report rate (TRR) of the touch sensing device TSD may increase.

In operation S26 of determining a drawing action in the touch area, the control unit 60 may determine whether the contact target continues the drawing action. When the contact target continues to contact the touch area, operations may be repeated by returning to operation S25 in which the touch area is sensed in the third sensing mode and the remaining area is sensed in the second sensing mode.

When it is determined that the drawing action is terminated, respective operations may be repeated by returning to operation S21 of sensing the first area and the second area in the first sensing mode.

Figure 13B:
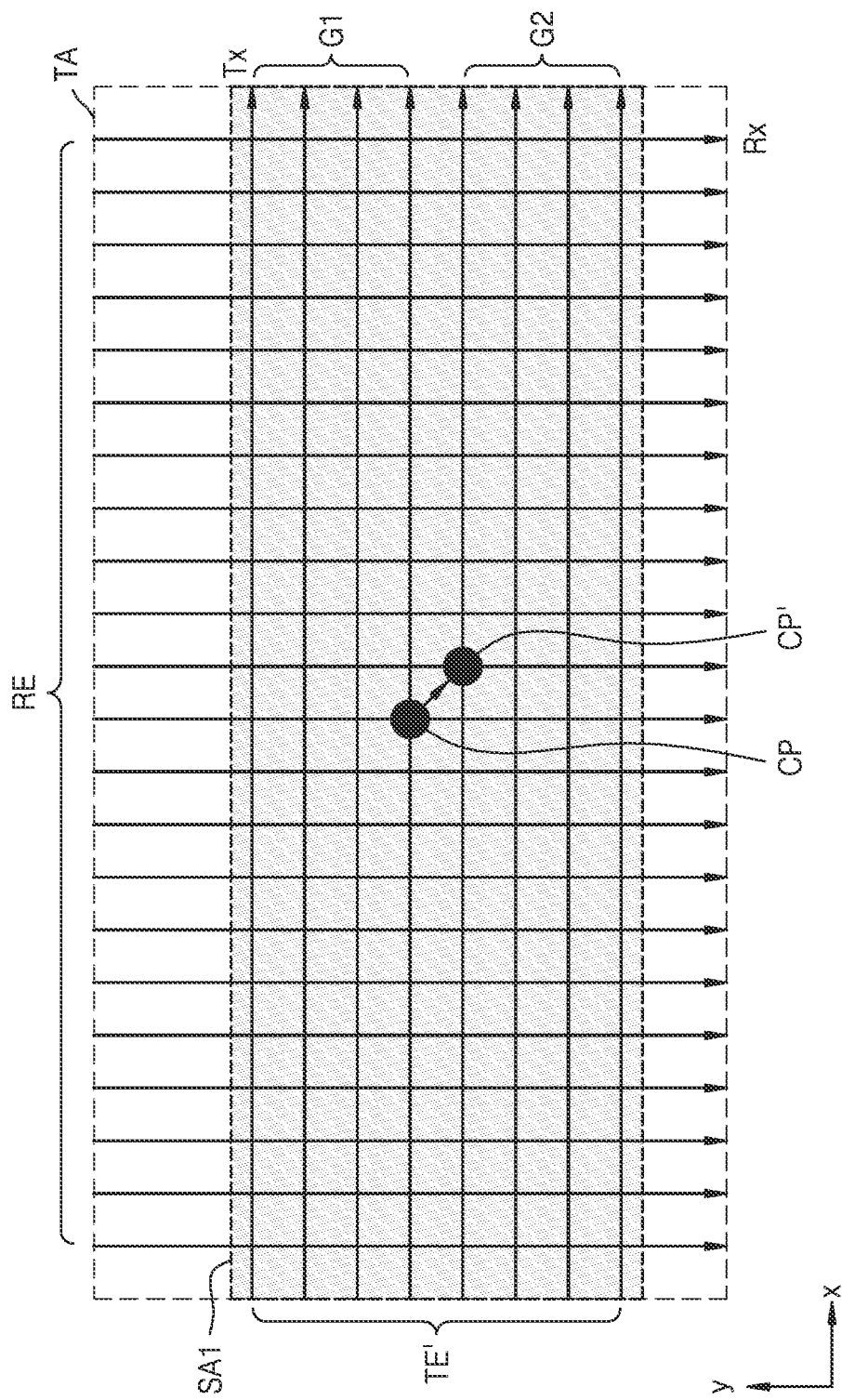
Figure 13C:
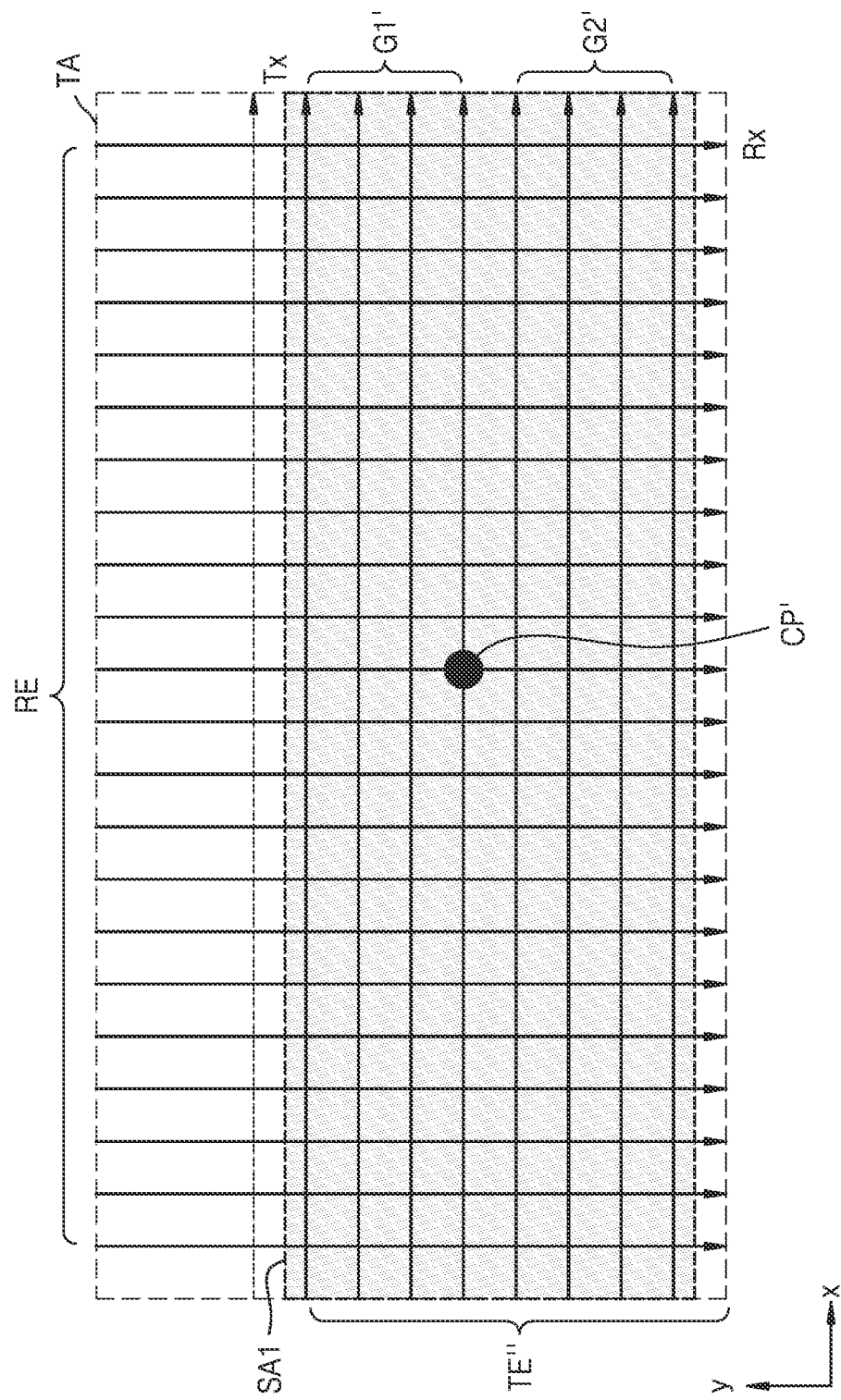

FIGS. 13A to 13C are diagrams for explaining a drawing mode, according to an embodiment. FIGS. 13A to 13C only show driving electrodes and sensing electrodes used for mutual capacitance variation sensing in each operation among the driving electrodes TE and the sensing electrodes RE.

Referring to FIGS. 13A to 13C, the driving electrodes TE and the sensing electrodes RE may be arranged in the touch area TA. The touch area TA may be an area including a touch location CP of the contact target among the first area A1 and the second area A2 of FIG. 6. When the touch area TA corresponds to the first area A1, the driving electrodes TE may correspond to the first driving electrode TEa, and the sensing electrodes RE may correspond to the first sensing electrode REa. When the touch area TA corresponds to the second area A2, the driving electrodes TE may correspond to the second driving electrode TEb, and the sensing electrodes RE may correspond to the second sensing electrode REb.

The driving electrodes TE may respectively extend in the first direction (the x direction) and be spaced apart from each other in the second direction (the y direction). The sensing electrodes RE may extend in the second direction (the y direction) and be spaced apart from each other in the first direction (the x direction). In the touch area TA, the driving electrodes TE and the sensing electrodes RE may cross each other.

The touch integrated circuit may perform mutual capacitance variation sensing for the touch area TA by respectively applying the driving signals Tx to the driving electrodes TE arranged in the touch area TA and receiving the sensing signals Rx through the sensing electrodes RE.

As shown in FIG. 13A, in operation (S23, see FIG. 11) of sensing the touch area in the first sensing mode and the remaining area in the second sensing mode, the mutual capacitance variation sensing for the touch area TA may be performed by using all of the driving electrodes TE and the sensing electrodes RE arranged in the touch area TA. That is, in the first sensing mode, the mutual capacitance variation sensing may be performed for the entire touch area TA.

As shown in FIG. 13B, after the drawing mode is activated, in operation (S25, see FIG. 11) of sensing the touch area in the third sensing mode and the remaining area in the second sensing mode, the mutual capacitance variation sensing for the touch area TA may be performed by using all driving electrodes TE' and all of the sensing electrodes RE arranged in the first sub-area SA1. That is, in the third sensing mode, the mutual capacitance variation sensing may be performed for the first sub-area SA1. In this case, the first sub-area SA1 may be defined as an area where the preset number of driving electrodes is arranged with respect to the touch location CP.

The driving electrodes TE' arranged in the first sub-area SA1 may be grouped into multiple groups including two or more driving electrodes, and the driving electrodes in one group may be simultaneously sensed. That is, a signal driver included in a touch integrated circuit may perform multi-channel driving during which different driving signals are simultaneously applied to respective driving electrodes included in one group, wherein such signal application may be enabled through a plurality of channels.

For example, the driving electrodes TE' arranged in the first sub-area SA1 may be grouped into a first group G1 and a second group G2, each of which includes four driving electrodes TE', four driving electrodes TE' in the first group G1 may simultaneously receive the driving signals Tx, and then, four driving electrodes TE' in the second group G2 may simultaneously receive the driving signals Tx.

The touch sensing device may expect that a moved touch location CP' of the contact target will be moved within the first sub-area SA1 that is adjacent to a touch location CP in a previous frame and perform the mutual capacitance variation sensing only for the first sub-area SA1, thus reducing the power consumption and increasing the TRR of the touch sensing device.

As shown in FIG. 13C, when the contact target continues to contact the touch area TA, operation S25 of sensing the touch area in the third sensing mode and the remaining area in the second sensing mode may be repeated again. In this case, as the touch location of the contact target is moved, the first sub-area SA1 may be moved to make the moved touch location CP' be at the center. The first sub-area SA1 may include an area where the preset number of driving electrodes is arranged with respect to the moved touch location CP'.

Driving electrodes TE" arranged in the moved first sub-area SA1 may be grouped into multiple groups including two or more driving electrodes, and the driving electrodes in one group may be simultaneously sensed. For example, the driving electrodes TE" arranged in the first sub-area SA1 may be grouped into a 1' group G1' and a 2' group G2', each of which includes four driving electrodes TE", four driving electrodes TE" in the 1' group G1' may simultaneously receive driving signals Tx, and then, four driving electrodes TE' in the 2' group G2' may simultaneously receive the driving signals Tx.

Figure 14A:
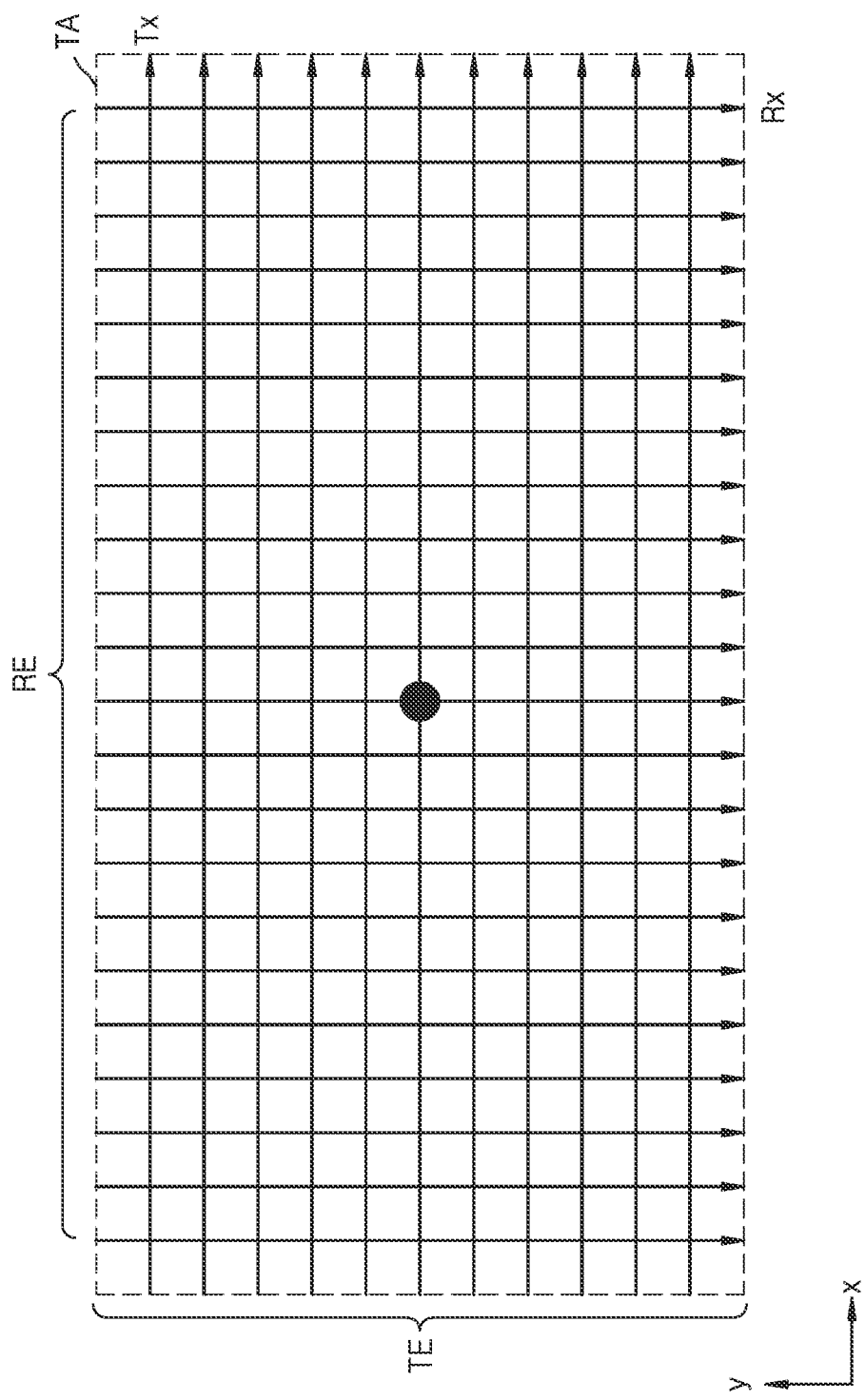
FIGS. 14A, 14B, and 14C are diagrams for explaining a drawing mode, according to another embodiment.
Figure 14B:
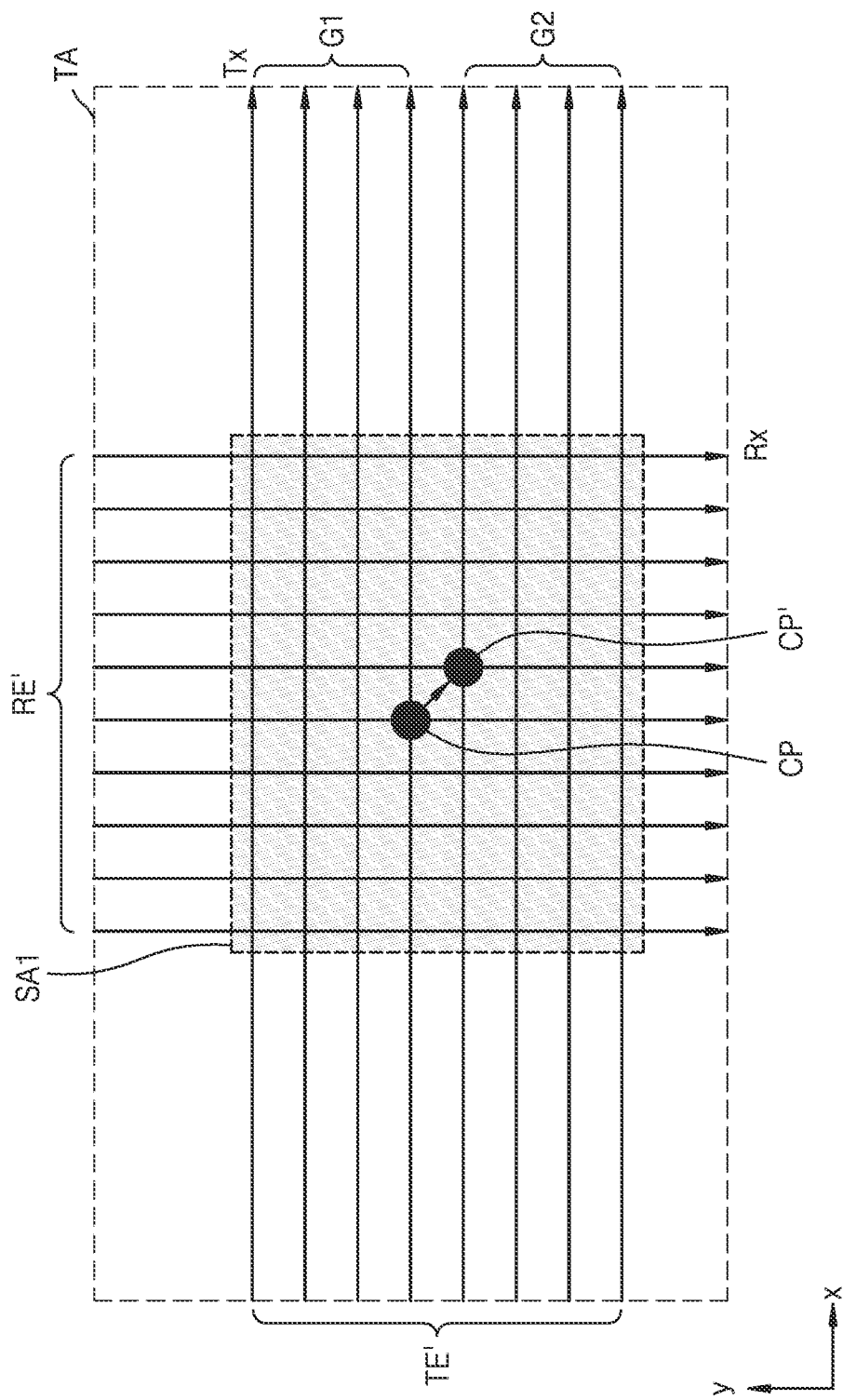
Figure 14C:
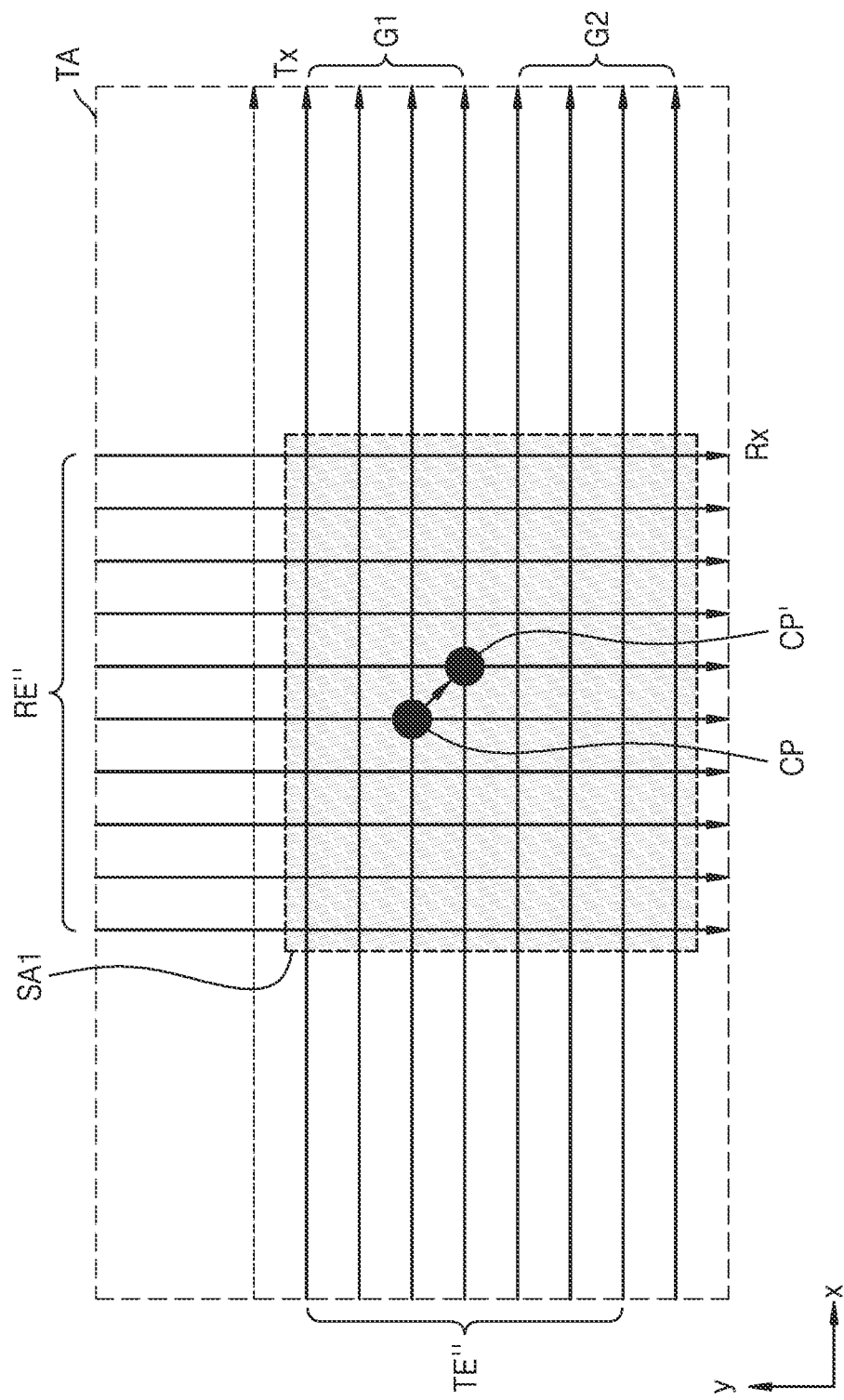

FIGS. 14A to 14C are diagrams for explaining a drawing mode, according to another embodiment. FIGS. 14A to 14C only show driving electrodes and sensing electrodes used for mutual capacitance variation sensing in each operation among the driving electrodes TE and the sensing electrodes RE.

Referring to FIGS. 14A to 14C, the driving electrodes TE and the sensing electrodes RE may be arranged in the touch area TA. The touch area TA may be an area including a touch location CP of the contact target among the first area A1 and the second area A2 of FIG. 6.

As shown in FIG. 14A, in operation (S23, see FIG. 11) of sensing the touch area in the first sensing mode and the remaining area in the second sensing mode, the mutual capacitance variation sensing for the touch area TA may be performed by using all of the driving electrodes TE and the sensing electrodes RE arranged in the touch area TA. That is, in the first sensing mode, the mutual capacitance variation sensing may be performed for the entire touch area TA.

As shown in FIG. 14B, after the drawing mode is activated, in operation (S25, see FIG. 11) of sensing the touch area in the third sensing mode and the remaining area in the second sensing mode, the mutual capacitance variation sensing for the touch area TA may be performed by using driving electrodes TE' crossing the first sub-area SA1 and sensing electrodes RE' crossing the first sub-area SA1. That is, the first sub-area SA1 may be defined as an area where the preset number of driving electrodes TE' crosses the preset number of sensing electrodes RE' to have the touch location CP at the center.

The driving electrodes TE' crossing the first sub-area SA1 may be grouped into multiple groups G1 and G2 including two or more driving electrodes TE', and the driving electrodes TE' in one group may be simultaneously sensed.

The touch sensing device may expect that a moved touch location CP' of the contact target will be moved within the first sub-area SA1 that is adjacent to a touch location CP in a previous frame and perform the mutual capacitance variation sensing by using only the driving electrodes TE' and the sensing electrodes RE' that are adjacent to the touch location CP.

As shown in FIG. 14C, when the contact target continues to contact the touch area TA, operation S25 of sensing the touch area in the third sensing mode and the remaining area in the second sensing mode may be repeated again. In this case, as the touch location CP of the contact target is moved, the first sub-area SA1 may be moved to make the moved touch location CP' be at the center. The first sub-area SA1 may be defined as an area where the driving electrodes TE'', of which the number is preset with respect to the moved touch location CP', cross the sensing electrodes RE'', of which the number is preset with respect to the moved touch location CP'.

Figure 15:
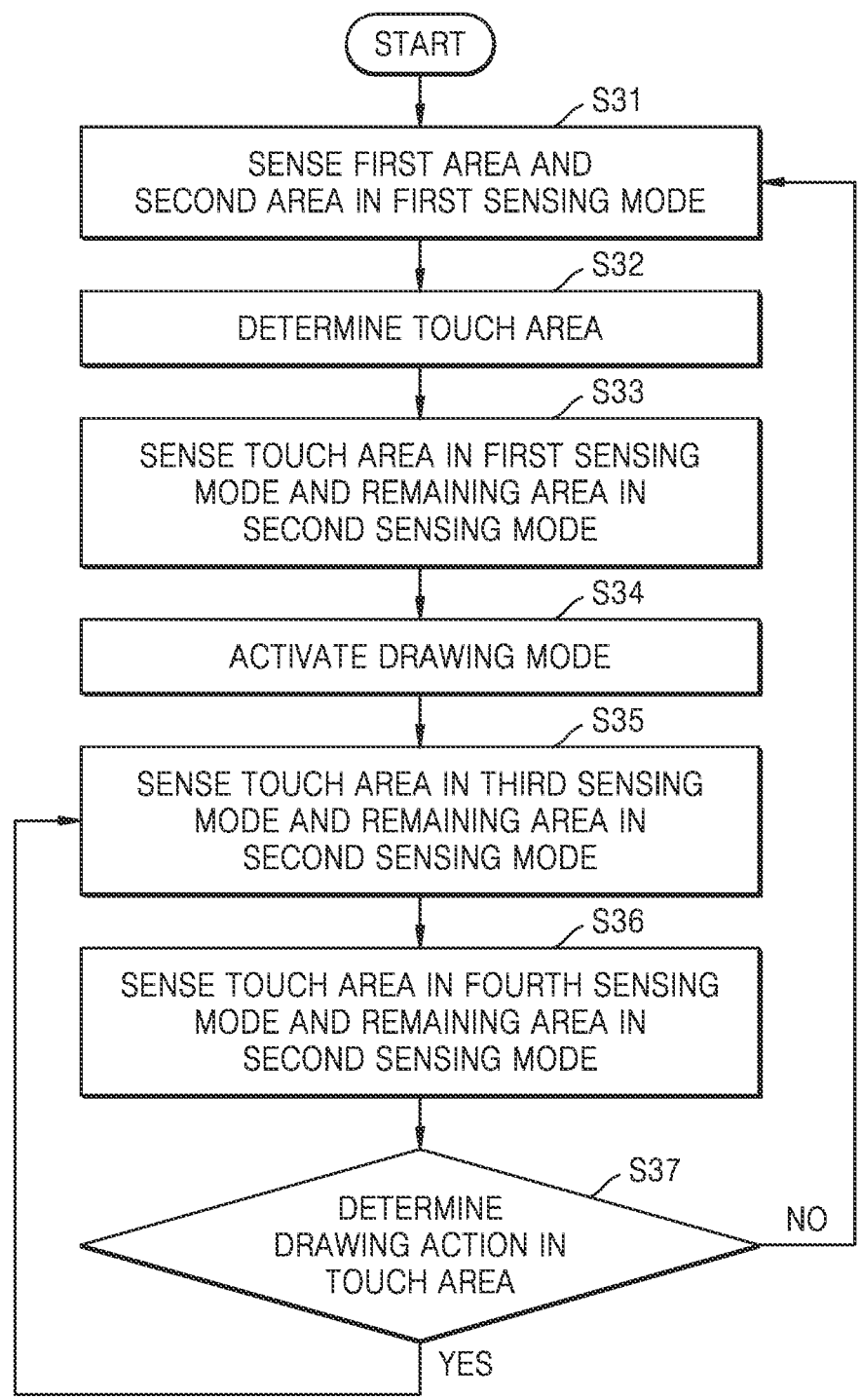
FIG. 15 is a flowchart for explaining a drawing determination method of a display apparatus, according to an embodiment.
Figure 16:
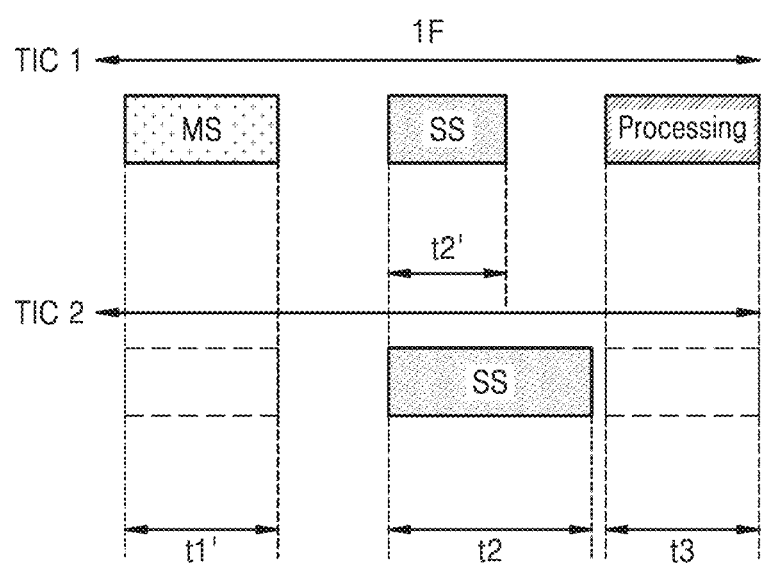
FIG. 16 is a diagram for explaining a sensing process in each operation of a display apparatus, according to an embodiment.

FIG. 15 is a flowchart for explaining a drawing determination method of a display apparatus, according to an embodiment, and FIG. 16 is a diagram for explaining a sensing process in each operation of a display apparatus, according to an embodiment.

Referring to FIGS. 15 and 16, the display apparatus may include the touch sensing device TSD, and the drawing determination method of the touch sensing device TSD may include operation S31 of sensing a first area and a second area in a first sensing mode, operation S32 of determining a touch area, operation S33 of sensing the touch area in the first sensing mode and the remaining area in a second sensing mode, operation S34 of activating a drawing mode, operation S35 of sensing the touch area in a third sensing mode and the remaining area in the second sensing mode, operation S36 of sensing the touch area in a fourth sensing mode and the remaining area in the second sensing mode, and operation S37 of determining a drawing action in the touch area.

Operation S31 of sensing a first area and a second area in a first sensing mode to operation S35 of sensing the touch area in a third sensing mode and the remaining area in the second sensing mode are similar to or substantially the same as operation S21 of sensing a first area and a second area in a first sensing mode to operation S25 of sensing the touch area in a third sensing mode and the remaining area in the second sensing mode, and thus, repeated descriptions are omitted hereinafter.

As shown in FIG. 16, in operation S36 of sensing the touch area in a fourth sensing mode and the remaining area in the second sensing mode, the control unit 60 may control the first touch integrated circuit TIC1 and the second touch integrated circuit TIC2 to sense the touch area in the fourth sensing mode and the remaining area in the second sensing mode.

In the fourth sensing mode, one frame 1F may include a 1' time period t1' in which mutual capacitance variation sensing MS is performed for a second sub-area determined with respect to the touch location, a 2' time period t2' in which self-capacitance variation sensing SS is performed for a third sub-area, and a third time period t3 in which the control unit 60 processes a first sensing signal and a second sensing signal. A 2' time period t2' may be less than the second time period t2 in which self-capacitance variation sensing SS is performed for the touch area.

In this case, the touch location that becomes a reference may be determined in a previous frame. The second sub-area may include an area where the preset number of driving electrodes is arranged with respect to the touch location. Alternatively, the second sub-area may include an area where the driving electrodes, of which the number is preset with respect to the touch location, cross the sensing electrodes, of which the number is preset with respect to the touch location.

The third sub-area may include an area where the driving electrodes, of which the number is preset with respect to the touch location, and the sensing electrodes, of which the number is preset with respect to the touch location, are arranged.

For example, in each frame 1F, the first touch integrated circuit TIC1 may transmit, to the control unit 60, the first sensing signal generated by performing the mutual capacitance variation sensing MS for a portion of the first area A1 and the self-capacitance variation sensing SS for a portion of the first area A1. The second touch integrated circuit TIC2 may transmit, to the control unit 60, the second sensing signal generated by performing the self-capacitance variation sensing SS for the second area A2. The control unit 60 may determine the occurrence of touch inputs and the touch locations based on the first sensing signal and the second sensing signal. The second touch integrated circuit TIC2 may be in the IDLE state during the 1' time period t1' in which the first touch integrated circuit TIC1 performs the mutual capacitance variation sensing MS.

The touch sensing device TSD may expect that the touch location of the contact target will be moved within the second sub-area and the third sub-area that are adjacent to a touch location in a previous frame and perform the mutual capacitance variation sensing MS only for the second sub-area and the self-capacitance variation sensing SS only for the third sub-area, thus reducing the power consumption.

In operation S37 of determining a drawing action in the touch area, the control unit 60 may determine whether the contact target continues the drawing action. When the contact target continues to contact the touch area, operations may be repeated by returning to operation S35 in which the touch area is sensed in the third sensing mode and the remaining area is sensed in the second sensing mode.

When it is determined that the drawing action is terminated, respective operations may be repeated by returning to operation S31 of sensing the first area and the second area in the first sensing mode.

Figure 17:
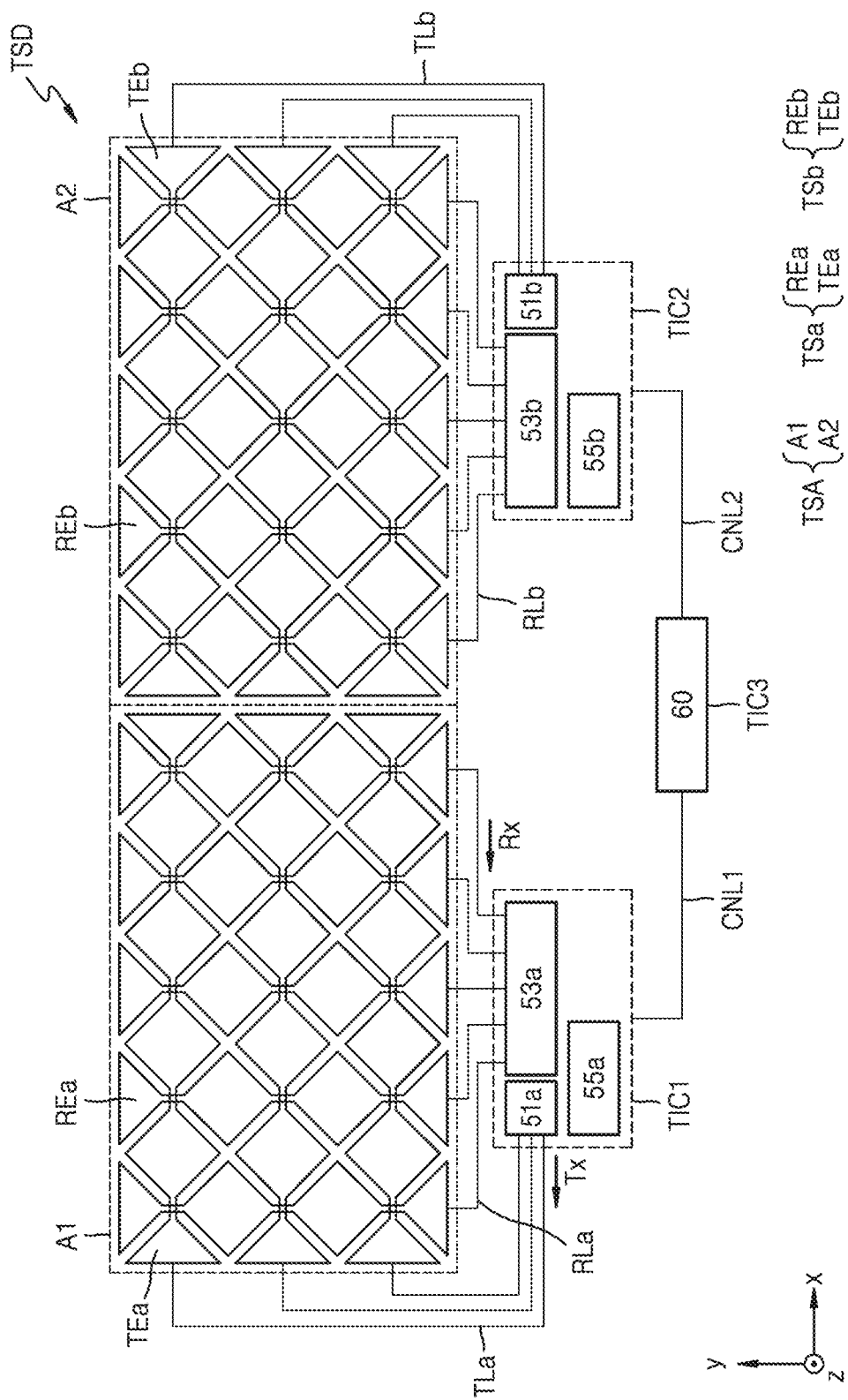
FIG. 17 is a schematic diagram of a touch sensing device included in a display apparatus, according to an embodiment.

FIG. 17 is a schematic diagram of a touch sensing device included in a display apparatus, according to an embodiment.

Referring to FIG. 17, a touch sensing area TSA may include a plurality of areas, and a touch sensing device TSD may include a plurality of touch sensors respectively corresponding to the areas, and a plurality of touch integrated circuits respectively controlling the touch sensors.

For example, the touch sensing area TSA may include a first area A1 and a second area A2. A first touch sensor TSa may overlap the display area (DA, see FIG. 1). In an embodiment, as shown in FIG. 17, the first area A1 and the second area A2 may be adjacent to each other in a first direction (an x direction). In another embodiment, the first area A1 and the second area A2 may be adjacent to each other in a second direction (a y direction). Alternatively, the first area A1 and the second area A2 may be spaced apart from each other.

The touch sensing device TSD may include the first touch sensor TSa arranged in the first area A1, a second touch sensor TSb arranged in the second area A2, a first touch integrated circuit TIC1 connected to the first touch sensor TSa, and a second touch integrated circuit TIC2 connected to the second touch sensor TSb.

The first touch sensor TSa may include a plurality of first driving electrodes TEa and a plurality of first sensing electrodes REa arranged in the first area A1. The second touch sensor TSb may include a plurality of second driving electrodes TEb and a plurality of second sensing electrodes REb arranged in the second area A2.

The first touch integrated circuit TIC1, the second touch integrated circuit TIC2, and the third touch integrated circuit TIC3 may correspond to the integrated circuits 40 of FIG. 1, respectively. In an embodiment, the first touch integrated circuit TIC1, the second touch integrated circuit TIC2, and the third touch integrated circuit TIC3 may be mounted on the circuit board (30, see FIG. 1).

The first touch integrated circuit TIC1 may include a first signal driver 51a, a first signal sensor 53a, and a first memory 55a. The first signal driver 51a may be electrically connected to the first driving electrodes TEa through first driving signal lines TLa and configured to apply driving signals Tx to the first driving electrodes TEa. The first signal sensor 53a may be electrically connected to the first sensing electrodes REa through first sensing signal lines RLa and receive sensing signals Rx from the first sensing electrodes REa to convert the same into digital signals.

The second touch integrated circuit TIC2 may include a second signal driver 51b, a second signal sensor 53b, and a second memory 55b. The second signal driver 51b may be electrically connected to the second driving electrodes TEb through the second driving signal lines TLb and configured to apply driving signals Tx to the second driving electrodes TEb. The second signal sensor 53b may be electrically connected to the second sensing electrodes REb through second sensing signal lines RLb and receive sensing signals Rx from the second sensing electrodes REb to convert the same into digital signals.

The third touch integrated circuit TIC3 may include the control unit 60. The third touch integrated circuit TIC3 may be an MCU or a CPU including a single chip. In this case, the third touch integrated circuit TIC3 may function as a master, and the first touch integrated circuit TIC1 and the second touch integrated circuit TIC2 may function as slaves. That is, the first touch integrated circuit TIC1 may transmit the first sensing signal to the control unit 60 of the third touch integrated circuit TIC3 through the first connection line CNL1, and the second touch integrated circuit TIC2 may transmit the second sensing signal to the control unit 60 of the third touch integrated circuit TIC3 through the second connection line CNL2.

The third touch integrated circuit TIC3 may determine the occurrence of touch inputs and the touch locations based on the first sensing signal and the second sensing signal and may control operation modes of the first touch integrated circuit TIC1 and the second touch integrated circuit TIC2.

Figure 18:
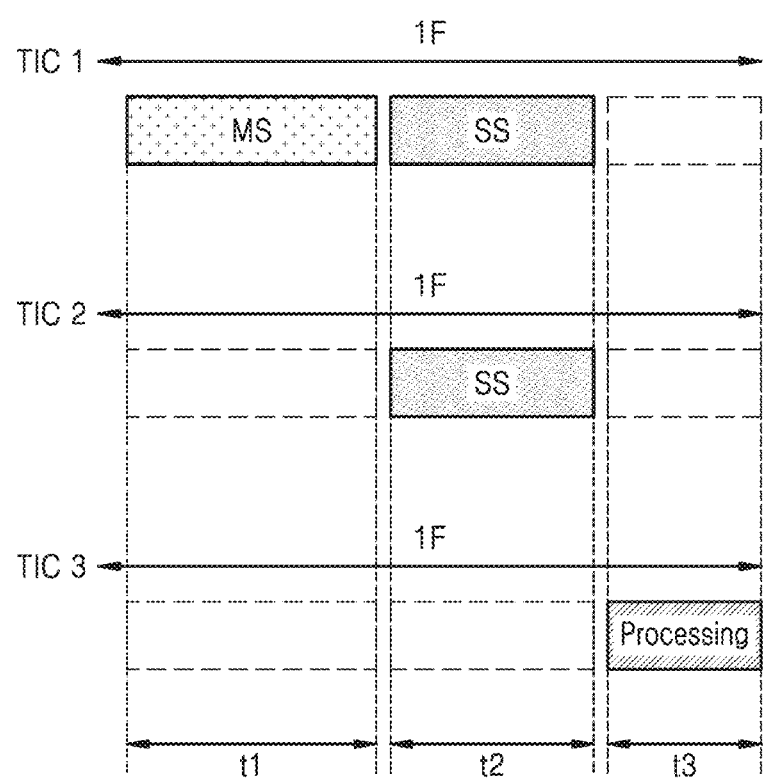
FIG. 18 is a diagram for explaining a sensing operation of the display apparatus of FIG. 17.

FIG. 18 is a diagram for explaining operation in each frame of the display apparatus of FIG. 17. FIG. 18 shows an example of operations of the first touch integrated circuit TIC1, the second touch integrated circuit TIC2, and the third touch integrated circuit TIC3 when the first area (A1, see FIG. 17) is selected as a touch area.

Referring to FIGS. 17 and 18, when the first area (A1, see FIG. 17) is selected as a touch area, the third touch integrated circuit TIC3 may control the first touch integrated circuit TIC1 and the second touch integrated circuit TIC2 to sense the touch area in the first sensing mode and the remaining area in the second sensing mode.

In the first sensing mode, one frame 1F may include a first time period t1 in which mutual capacitance variation sensing MS is performed, a second time period t2 in which self-capacitance variation sensing SS is performed, and a third time period t3 in which the control unit 60 processes a first sensing signal and a second sensing signal. In the third time period t3, the first sensing signal and the second sensing signal may be processed only by the third touch integrated circuit TIC3 including the control unit 60.

In the second sensing mode, one frame 1F may include a first time period t1 in which sensing is not performed, a second time period t2 in which self-capacitance variation sensing SS is performed, and a third time period t3 in which the control unit 60 processes a first sensing signal and a second sensing signal. In the first time period t1 in which the first touch integrated circuit TIC1 performs the mutual capacitance variation sensing MS, the second touch integrated circuit TIC2 may be in the IDLE state. In the third time period t3 in which the third touch integrated circuit TIC3 processes the first sensing signal and the second sensing signal, the first touch integrated circuit TIC1 and the second touch integrated circuit TIC2 may each be in the IDLE state.

Even when the touch area is sensed in the third sensing mode described with reference to FIG. 12C or the fourth sensing mode described with reference to FIG. 16, in the third time period t3, the first sensing signal and the second sensing signal may be processed only by the third touch integrated circuit TIC3 including the control unit 60, as shown in FIG. 18. In the third time period t3 in which the third touch integrated circuit TIC3 processes the first sensing signal and the second sensing signal, the first touch integrated circuit TIC1 and the second touch integrated circuit TIC2 may each be in the IDLE state.

As shown in the drawings, by using the touch integrated circuits to split-drive the touch sensing device (TSD, see FIG. 17), the RC load on each touch integrated circuit may decrease.

Figure 19:
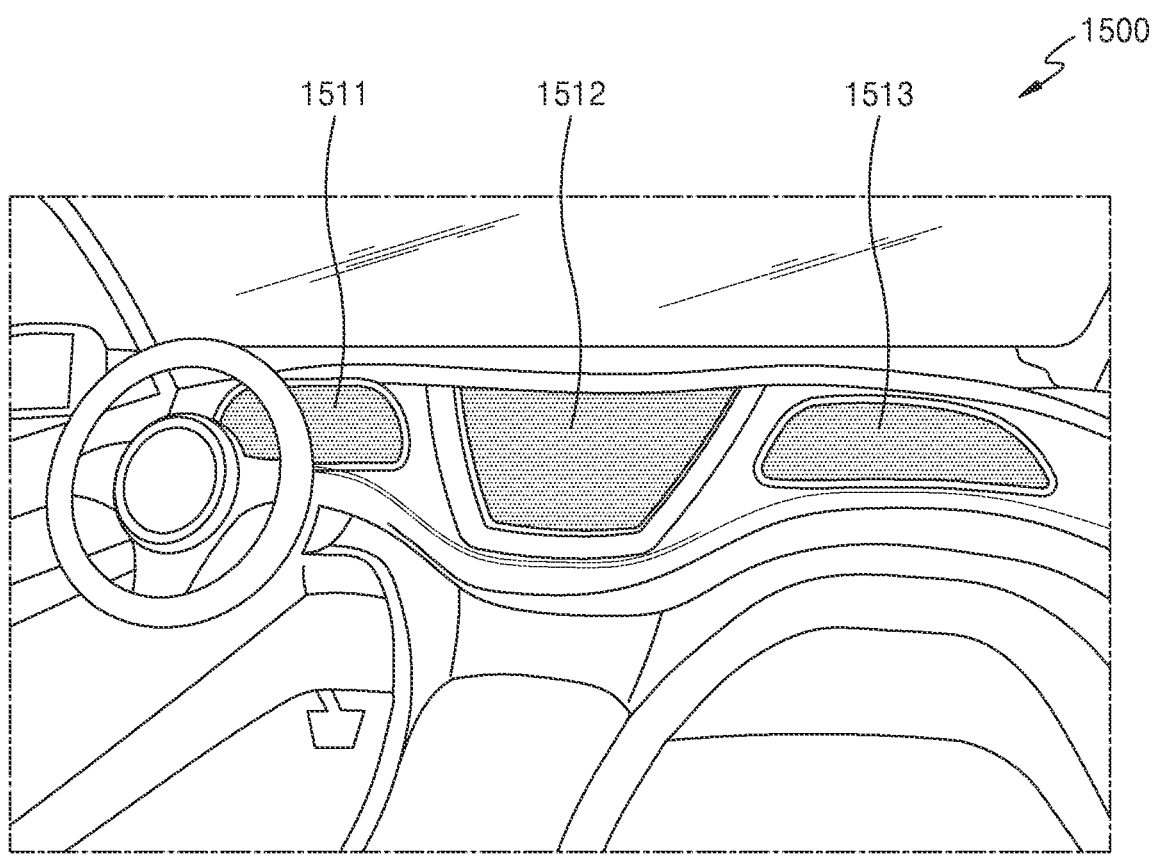
FIG. 19 is a diagram showing an instrument panel and a center fascia including a display apparatus, according to an embodiment.

FIG. 19 is a diagram showing an instrument panel and a center fascia including a display apparatus, according to an embodiment.

Referring to FIG. 19, the display apparatus (1, see FIG. 1) may be a display apparatus 1511 applied to an instrument panel of a vehicle 1500, a display apparatus 1512 applied to a center fascia, or a display apparatus 1513 positioned on a dashboard.

In an embodiment, the display apparatus 1511 applied to the instrument panel of the vehicle 1500, the display apparatus 1512 applied to the center fascia, or the display apparatus 1513 positioned on the dashboard may have a different aspect ratio or a greater area, compared to a display apparatus, such as a monitor or a smartphone.

Touch sensing devices included in the display apparatuses 1511, 1512, and 1513 may each have a touch sensing area divided into multiple areas. The touch sensing device may include touch sensors respectively corresponding to the areas, touch integrated circuits respectively controlling the touch sensors, and a control unit. The control unit may control the touch integrated circuits to select a touch area including a touch location of a contact target and sense the touch area and remaining areas in different sensing modes.

According to the one or more embodiments, a display apparatus having a great touch sensing area and consuming a small amount of power may be realized. However, the scope of the disclosure is not limited by the effects.

Embodiments described herein should be considered in a descriptive sense and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made therein without departing from the spirit and scope as defined by the following claims.

What is claimed is:

1. A display apparatus comprising:
   a first touch sensor comprising a plurality of first driving electrodes arranged in a first area and a plurality of first sensing electrodes crossing the plurality of first driving electrodes;
   a second touch sensor comprising a plurality of second driving electrodes arranged in a second area and a plurality of second sensing electrodes crossing the plurality of second driving electrodes;
   a first touch integrated circuit connected to the plurality of first driving electrodes and the plurality of first sensing electrodes and configured to generate a first sensing signal;
   a second touch integrated circuit connected to the plurality of second driving electrodes and the plurality of second sensing electrodes and configured to generate a second sensing signal; and
   a control unit configured to select a touch area comprising a touch location from among the first area and the second area, based on the first sensing signal and the second sensing signal, and control the first touch integrated circuit and the second touch integrated circuit to sense the touch area in a first sensing mode and a remaining area in a second sensing mode.

2. The display apparatus of claim 1, wherein the first touch integrated circuit and the second touch integrated circuit are configured to:
   sense, in the first sensing mode, a variation in mutual capacitance in a corresponding area and a variation in self-capacitance in the corresponding area; and
   sense, in the second sensing mode, the variation in the self-capacitance in the corresponding area.

3. The display apparatus of claim 1, wherein, in an initial state in which there is no contact with a contact target, the control unit is configured to control the first touch integrated circuit and the second touch integrated circuit to sense the first area and the second area in the first sensing mode.

4. The display apparatus of claim 3, wherein, when it is determined that there is no touch in the touch area, the control unit is configured to control the first touch integrated circuit and the second touch integrated circuit to sense the first area and the second area in the first sensing mode.

5. The display apparatus of claim 1, wherein, when it is determined that there is a touch in the touch area, the control unit is configured to control the first touch integrated circuit and the second touch integrated circuit to sense the touch area in the first sensing mode and the remaining area in the second sensing mode.

6. The display apparatus of claim 1, wherein, when a contact target maintains a touch for a preset period of time or more, the control unit is configured to control the first touch integrated circuit and the second touch integrated circuit to sense the touch area in a third sensing mode and the remaining area in the second sensing mode.

7. The display apparatus of claim 6, wherein the first touch integrated circuit and the second touch integrated circuit are configured to sense a variation in mutual capacitance in a first sub-area and a variation in self-capacitance in the touch area in the third sensing mode, the first sub-area being determined to have the touch location at a center of the first sub-area.

8. The display apparatus of claim 7, wherein the first sub-area comprises a number of driving electrodes, the number being determined to have the touch location at the center of the first sub-area.

9. The display apparatus of claim 8, wherein, as the touch location is moved, the first sub-area is moved to make the touch location be at a center.

10. The display apparatus of claim 8, wherein the driving electrodes arranged in the first sub-area are grouped into a plurality of groups each comprising at least two driving electrodes, and the at least two driving electrodes in one group are simultaneously sensed.

11. The display apparatus of claim 6, wherein the control unit is configured to control the first touch integrated circuit and the second touch integrated circuit to sense the touch area alternately in the third sensing mode and a fourth sensing mode and the remaining area in the second sensing mode.

12. The display apparatus of claim 11, wherein the first touch integrated circuit and the second touch integrated circuit are configured to:
   sense a variation in mutual capacitance in a first sub-area and a variation in self-capacitance in the touch area in the third sensing mode; and
   sense a variation in mutual capacitance in a second sub-area and a variation in self-capacitance in a third sub-area in the fourth sensing mode, each of the second sub-area and the third sub-area being determined to make the touch location be at a center of each sub-area.

13. The display apparatus of claim 12, wherein each of the first sub-area and the second sub-area comprises an area in which a number of driving electrodes is arranged, the number being determined to have the touch location at the center of each sub-area, and
   the third sub-area comprises an area where a number of driving electrodes and a number of sensing electrodes are arranged, the numbers being determined to have the touch location at the center of the third sub-area.

14. The display apparatus of claim 12, wherein the first sub-area comprises an area where a number of driving electrodes is arranged, the number being determined to have the touch location at the center of the first sub-area,
   the second sub-area comprises an area where a number of driving electrodes and a number of sensing electrodes are arranged, the numbers being determined to have the touch location at the center of the second sub-area, and
   the third sub-area comprises an area where a number of driving electrodes and a number of sensing electrodes are arranged, the numbers being determined to have the touch location at the center of the third sub-area.

15. The display apparatus of claim 12, wherein, as the touch location is moved, the second sub-area is moved to make the touch location be at a center.

16. The display apparatus of claim 1, wherein the first touch integrated circuit is arranged adjacent to the first area, and the second touch integrated circuit is arranged adjacent to the second area.

17. The display apparatus of claim 16, wherein the control unit is mounted on the first touch integrated circuit, and the second touch integrated circuit is electrically connected to the first touch integrated circuit.

18. The display apparatus of claim 16, further comprising a third touch integrated circuit electrically connected to the first touch integrated circuit and the second touch integrated circuit, wherein the control unit is mounted on the third touch integrated circuit.

19. The display apparatus of claim 1, wherein each of the first touch integrated circuit and the second touch integrated circuit comprises:

a signal driver configured to apply a plurality of driving signals to a plurality of driving electrodes connected to a corresponding integrated circuit;

a signal sensor configured to receive a plurality of sensing signals from a plurality of sensing electrodes connected to the corresponding integrated circuit; and a memory.

20. The display apparatus of claim 19, wherein the signal driver performs multi-channel driving during which the plurality of driving signals are simultaneously applied to two or more driving electrodes through a plurality of channels.

* * * * *